(12) United States Patent
Hor et al.

(10) Patent No.: US 8,326,732 B2
(45) Date of Patent: Dec. 4, 2012

(54) ANALYSIS OF PROPOSED TRADES

(75) Inventors: Edmund Hon Wah Hor, Kent (GB); Paul Cechner, Crodon (GB)

(73) Assignee: Trayport Limited, London (GB)

( * ) Notice: Subject to any disclaimer, the term of this patent is extended or adjusted under 35 U.S.C. 154(b) by 790 days.

(21) Appl. No.: 12/354,128

(22) Filed: Jan. 15, 2009

(65) Prior Publication Data

US 2009/0210338 A1  Aug. 20, 2009

Related U.S. Application Data

(60) Provisional application No. 61/021,122, filed on Jan. 15, 2008.

(51) Int. Cl.
*G06Q 40/00* (2012.01)

(52) U.S. Cl. .......................................... 705/37; 340/4.5

(58) Field of Classification Search .................... 705/37; 340/4.5
See application file for complete search history.

(56) References Cited

U.S. PATENT DOCUMENTS

| | | | | |
|---|---|---|---|---|
| 4,412,287 A | * | 10/1983 | Braddock, III | 705/37 |
| 5,101,353 A | * | 3/1992 | Lupien et al. | 705/37 |
| 5,136,501 A | * | 8/1992 | Silverman et al. | 705/37 |

* cited by examiner

*Primary Examiner* — Daniel Felten
(74) *Attorney, Agent, or Firm* — Goodwin Procter LLP

(57) ABSTRACT

A rules-based schema is designed as a directed graph to model various electronic trading markets and trading constraints inherent therein such that the executability of proposed trades having multiple trade parameters can be determined by applying the trade parameters against the constraints, and confirming the executability of the trade if the constraints are satisfied.

22 Claims, 29 Drawing Sheets

ANALYSIS OF PROPOSED TRADES

CROSS-REFERENCE TO RELATED APPLICATIONS

This application claims priority to and the benefits of U.S. provisional patent application Ser. No. 61/021,122, entitled "Analysis and Execution of Proposed Trades" filed Jan. 15, 2008, the entire disclosure of which is incorporated herein by reference.

FIELD OF THE INVENTION

The invention relates generally to the electronic trading of securities and other financial instruments. More specifically, embodiments of the invention provide methods and systems for increasing the liquidity of a market by calculating and/or reviewing trade parameters with respect to certain market constraints to determine the executability of a trade.

BACKGROUND

Historically, the execution of trades between participants in financial markets has been governed by various agreements between the parties that determine whether a particular trade can be executed. With the advent of online trading exchanges, these agreements have typically been "hard coded" into a set of trading rules that attempt to enforce the business terms of the agreements. As such, modeling and maintaining a particular market (or a series of markets) having multiple participants and rules becomes a difficult task.

One key function within a market is to be able to determine the tradability of a particular order or executability of a trade, as in fact there are many different reasons why a trade may not be executed. Existing trading systems have limited capabilities with respect to the determination of the tradability of orders between parties in the market. For example, systems that are limited to trading cleared instruments may only consider clearing house membership rules as a constraint on the trade. Similarly, systems that trade over the counter ("OTC") may only enforce certain credit-based constraints.

Furthermore, tasks such as finding intermediary parties to complete trades between parties (referred to as "sleeving") when a direct trade is either impossible or less than desirable (e.g., when there is no credit agreement between the trading parties or one or both of the trading parties wish to remain anonymous) are currently performed manually by brokers, thus adding time delays and costs to the trading process. Techniques and supporting systems for automating these tasks and indicating trade status in real-time to the traders would automate what is currently a manual procedure, and as a result greatly increase the liquidity and efficiency of the market by allowing previously unachievable flexibility.

SUMMARY OF THE INVENTION

Aspects of the invention provide a tradability assessment system and associated techniques for determining the executability of a trade within markets that include a wide range of asset classes (instruments). Such an approach affords a flexible and dynamic methodology for defining, storing, configuring, enforcing, enabling and determining the tradability of a given trade by examining complex constraints and parameters attributed to specific instruments, trades and trading parties. These constraints may include, but are not limited to, day ranges of the instruments or trade, market regulations, physical characteristics of the commodity or instrument being traded, geographical or other external constrains between parties, clearing house constraints, credit arrangement constraints, trading party preferences, and others. These constraints are analyzed and the results (1, 0, Yes, No, Unknown, Defer, Refer, Probability of Success as well as other quantitative or qualitative indicators) are used to determine whether, when and/or how a trade may be executed. Furthermore, by exploiting various constraints enforced on a given trade between the parties, the execution of a trade may be determined and/or modified by combining the trade with other trades and/or counter-parties, sometimes from different asset classes or markets.

Potential trades among two or more parties are analyzed with respect to parameters describing the trade and structural attributes of the market in which the trade is to be executed in order to determine the executability of the trade. The attributes are referred to herein as "agreements" although these need not be formal, contractual agreements between parties. As used below, the term "agreement" may refer to any constraint or action that is to be satisfied or used in order for a trade to be considered executable. In some cases, an agreement may reflect a positive constraint (e.g., trades may or must use a particular clearing house), whereas in other cases the agreements may be used to enforce a negative constraint (trades between party X and party Y are not permitted). Users model the markets as a directed graph in which the nodes of the graph are a collection of these agreements, of which there are numerous types. The agreements are defined and stored using a computer-based trading system which maintains a trading channel between the trading parties and determines, in real time, offline, synchronously or asynchronously, whether a trade is executable or not, parameters and information relating to the trade and how it is to be executed, and in some cases executes the trades according to the trade parameters.

In some instances, the determination as to the executability of the trade determines whether and/or which information about the trade is passed on to a trading platform, which in turn determines whether or how the trade is shown to a particular trading party, allowing "filtering" or highlighting based on the executability of a trade or trades. For example, the trading platform may represent an executable trade as bold and presented in a particular color, whereas trades with a low (or no) chance of being executed are displayed in a different color or, in some cases, not displayed at all.

Accordingly, a method for determining the executability of a proposed trade having multiple trade parameters within a market includes the steps of providing a rules schema organized as a directed graph of agreements that represents constraints associated with the market, applying the trade parameters against the constraints, and determining if the constraints are satisfied. In some instances, the directed graph may resemble a hierarchical structure in which a "child" constraint can only depend from a single "parent" constraint. Conversely, the schema may also be modeled as a directed graph in which a particular constraint depends from multiple parent constraints, thus facilitating the reuse of constraints across multiple markets. The trade parameters may include a time at which the trade is to be executed (e.g., immediately, at some date in the future, within a time window, etc.), at least two explicit or implicit trading parties (typically where both parties are not the same entity) and an indication as to what is being traded. The tradable subject matter may be stocks, equities, corporate bonds, government bonds, commodities, mutual funds, fixed-income investments, exchange-traded funds, futures, forwards, currency contracts, carbon credits, weather derivatives, and/or any derivatives thereof, or any tangible or non-tangible good that can be bought or sold over an electronic network. The constraints may, in some embodiments, include one or more time-based parameters (e.g., a specific date, a date range, or a duration of time during which the trade may be executed), party-based parameters defining which parties can or cannot trade with each other, and/or subject matter constraints defining what constitutes tradable subject matter within a given market.

Within the schema, each type of constraint may depend on or be linked to any of the others, including constraints of the same type. For example, a time-based constraint may depend from a subject-matter constraint, meaning that for that particular instrument, certain date restrictions govern whether or not a trade may be executed for that instrument. Likewise, a party-based constraint may depend from a subject-matter constraint such that a proposed trade for a particular instrument is only executable if an agreement between the two proposed parties exists and the trade parameters (e.g., value of the trade) falls within certain specified limits. More specifically, a party-based constraint may define whether or not (or to what extent) two parties have negotiated the necessary arrangements allowing the two parties to trade.

Constraints may also represent position-limiting agreements that limit trades based on the positions of the counterparties to the trade, thereby disallowing trades that would cause a party's position in a particular instrument to exceed (or fall below) some configured or calculated threshold. The position volume limits may be implemented for both long and short positions on a per-instrument, per-counterparty basis. Some embodiments may include constraints that implement value-based limits, separate limiting for unrealized positions (current market value of open positions) and realized positions (total profit on all closed positions), per-company position limiting, and/or limiting volume or value over a rolling time period. Another implementation may delegate the exact calculation of the position limit to an external risk management algorithm that may also include portfolio management parameters that further define particular position limitations.

In certain implementations, the trade parameters may be modified in order to allow or increase the probability of trade execution based on the agreements. As such, the constraints may indicate that a trader, broker or other party to a trade (or some or all of the parties participating in a particular market) prefers to have one or more of the trade parameters modified, either in the absolute (i.e., modifying the trade such that the analysis of the constraint returns a "1" instead of a "0") or by varying the probability that the trade be completed. For example, a "bridging" or "sleeving" agreement may be used to indicate that a party would prefer the trade to be conducted indirectly, with a third-party sleever conducting trades on its behalf. Some embodiments may also include an agreement that incorporates the concept of some traders underwriting others, allowing one trading party to provide credit for another trader, act as guarantor for another trader, or even masquerade as that party. In such instances, a trader's position with particular counterparties may be affecting in that the trader may directly execute a trade that may otherwise have not been executable.

In some embodiments, constraints of a particular type may depend on constraints of the same type—e.g., a subject-matter constraint may depend from another subject matter constraint, thereby defining a "sub-market." For example, a constraint defining a bond market may have multiple "children" constraints depending from it that define different bond sub-markets such as sovereign bonds, corporate bonds, emerging bonds and premium bonds. In some cases, the subject-matter constraints may represent clearing or settlement agreements that govern trades executed within a market. For example, trades within a particular market may be executed "over the counter" whereas other trades may be cleared through a predetermined clearing house.

In applying the parameters against the constraints, the directed graph is "traversed" by starting at the most general level of the graph and determining if any constraints depend therefrom. If so, the dependent constraints are analyzed. If additional constraints exist, the process continues until a tradability result has been determined. In some instances, the analysis may return a Boolean value reflecting the executability of the trade (i.e., 1=executable, 0=non-executable) with respect to that constraint. In other cases, the tradability analysis for a particular constraint may result in a deferral, indicating that the analysis should continue with subsequent nodes in the directed graph. As such, the resultant tradability is derived from the analysis of some or all of the constraints within the graph. In some embodiments, only a subset of the constraints (specific constraints and/or a minimum number, for example) need be analyzed to allow the trade.

In some embodiments, the constraints may return a non-deterministic value representing a probability that a particular constraint may be satisfied, resulting in an overall probability that the trade (or order on which the trade may be executed) is executable. Thresholds may then be applied when presenting the potential trade to a user such that various colors or presentation methods (e.g., bold, blinking, underlined, etc.) are used to indicate various probability "bands."

In addition to the steps outlined above, the method may also include deriving a trading strategy to be implemented by the trading system in order to execute the trade.

In another aspect of the invention, a method for executing a proposed trade having multiple trade parameters within a market includes providing a rules schema organized as a directed graph that represents constraints associated with the market. One or more "action" constraints may define how and/or when a trade parameter may be modified to ensure (or vary the probability that) the trade can be executed. The trade parameters are applied against the constraints, and if the trade is executable, the trade is completed. If, however, one or more changes to the trade parameters need to be made to allow execution, the action constraints may be used to alter trade parameters, the executability of the trade is reassessed, and if executable, the trade may then be completed based on the altered parameters.

In another aspect of the invention, a system for modeling a market such that the executability of a trade within the market can be determined. The system includes a market design module for facilitating the definition and arrangement of the market constraints and a trade analysis module for evaluating trade parameters against the constraints. In some instances, the system may also include a data storage module for storing the constraints and trades.

In some embodiments, the trade analysis module further determines additional trading metadata associated with the trade and provides the trading metadata to a trade execution system, at which the trade may be executed according to the trading metadata.

In another aspect, the invention provides an article of manufacture having computer-readable program portions embedded thereon. The program portions include instructions for determining the executability of a proposed trade within a market. More specifically, the instructions implement a computer application for use in designing and using a model schema in the form of a directed graph of rules, constraints and preferences which facilitate the receipt and processing of trade parameters associated with the trade. The trade parameters are applied against the trading constraints as contained in the graph in order to determine the executability of the trade.

In some embodiments, the program portions further comprise instructions for transmitting the trade parameters to a trade execution system for execution of the trade thereon.

BRIEF DESCRIPTION OF FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
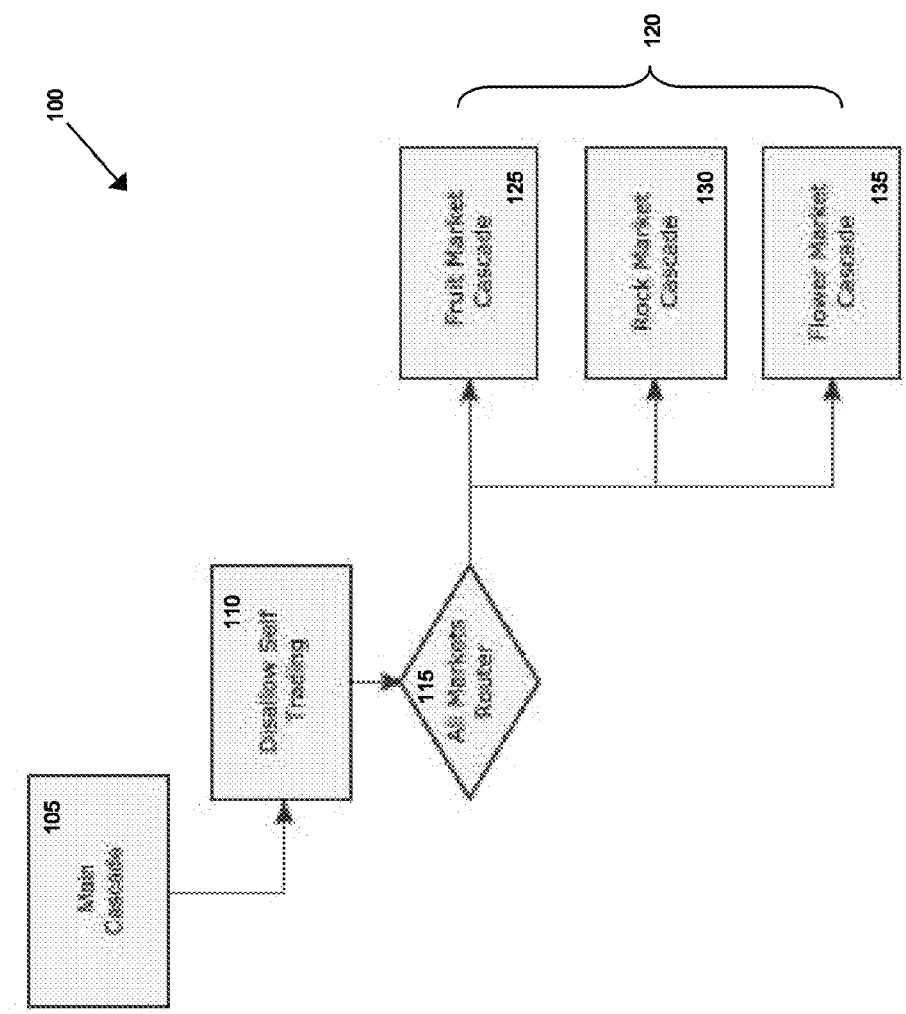
FIG. 1 illustrates a trading market modeled as a directed graph in accordance with one embodiment of the invention.

The invention provides various techniques and systems that greatly increases the flexibility with which traders and other parties participating in electronically implemented trading markets can model the various agreements among the parties and market constraints governing how, when and if trades are executed. As a result, more information (both in quantity and accuracy) is provided to trading parties, thereby increasing market liquidity and efficiency (e.g., the number of actionable trades) within the markets. Embodiments of the invention facilitate the modeling of markets as a collection of "agreements" organized into a directed graph that, as additional nodes of the graph are defined as specific agreements, provide more specific constraints that govern proposed trades. The determination of whether or not a particular order can be traded between parties is calculated as a collection of values (either binary or stochastic) based on the application of the trade parameters against those constraints that relate to the proposed trade. As such, embodiments of the invention facilitate the determination of tradability utilising a collection of configurable trading agreements, which influence the tradability determination based on the context for a given trade and the current context of the trading platform. Furthermore, the actual execution of a trade may be effected by one or more agreements that indicate whether and/or how to modify a trade in order to allow execution.

In general, and according to various embodiments of the invention, tradable instruments (i.e., the subject matter of what is being traded) can be divided into distinct groupings (referred to herein as "markets"), each being defined using one or more agreements and/or constraints such that the trading agreements match the structure of the markets. By doing so, the tradability rules may be maintained on a market-by-market basis and shared across markets, if applicable.

The following definitions are used throughout the disclosure:

Agreement (or Trading Agreement): A single constraint unit within the trading system. Each row in a trading partners window represents one trading agreement. Each agreement has an agreement type. Agreements may represent permitted or prohibited trades, trading parties' preferences, legal agreements, geographical constraints, physical constraints, political constraints, credit preferences, clearing preferences, clearing house memberships, market constraints, as well as other rules that may govern the tradability of an item.

Agreement Data: All the information associated with an agreement.

Agreement Set: The complete set of agreements in place on a server for a particular market or markets.

Agreement Type: Each trading agreement is of a particular type, each providing a specific set of functions, including the tradability calculations and user interfaces.

Cascade Agreement: A type of router agreement. The cascade agreement delegates to a sequence of other agreements in order, taking the first definitive result (except for "deferred" as defined below).

Decider Agreement: An agreement whose tradability calculation is based on some absolute criterion checked against the trade parameters. The Fixed, Calendar, Sequence Bilateral, and Clearing agreements are all examples of decider agreements.

Deferred: A special tradability value that indicates a tradability query should continue to the "next agreement." For example, if one of the agreements in a Cascade agreement defers to the next agreement, then the Cascade agreement will move to the next agreement in the list.

Delegate: The router agreement types (such as the Cascade and Instrument agreements) are said to "delegate" to other agreements in order to determine the result of the tradability calculation.

Execution: A secondary result of a tradability calculation indicating special conditions that may come into play if and when the trade is done. The execution is only valid if the result of the tradability analysis is "Yes."

Executability: See Tradability.

Instrument: A tradable contract of a particular subject matter represented in the system typically comprised of an instrument definition, an associated sequence, and the specific sequence item (period) being traded.

Instrument Agreement: A type of router agreement that delegates to one or more other agreements based on the instrument involved in the current tradability calculation.

Logical Agreement: An agreement whose primary function is to enforce market-level rules. These agreements perform a fixed action or a fixed calculation during tradability calculations. The Period Spread, Period Range, Combination, and Disallow Self Trading agreements are examples of logical agreements.

Main Agreement: An agreement designated by the administrator to be the primary agreement in the set to consult when conducting a tradability calculation. The processing flow starts with the main agreement (although the main agreement may delegate to any number of other agreements).

Market: A grouping of related instruments that maintain the same tradability between differing counter parties.

Reference: A link between two agreements. For example, if agreement A refers to agreement B, A is said to have a reference to B and B is said to a reference from A. It is also said that A has an outgoing reference to B and B has an incoming reference from A.

Router: An agreement whose tradability calculation is defined in part by its outgoing References.

Sleeving: Conducting a trade by proxy through one or more intermediary traders or, in some cases, allowing one party to masquerade as another party.

Tradability: The primary result of a tradability calculation (also referred to herein as executability).

Tradability Calculation: A query into the agreement set to determine whether or not two counter parties can trade a particular instrument and period.

Structural agreements (the Cascade and Instrument agreements) can be used to define specific markets within a trading system. If necessary, an additional level (or levels) of structural agreements may be used to further divide these markets into sub-markets, resulting in distinct sub-markets for each set of common tradability rules. For example, if all the apples instruments that are traded have similar rules, then a single market may be used to specify the rules for all types of apples. However, if blood oranges are a much more restricted or regulated commodity than Valencia oranges, then each should be defined as separate sub-markets (within an Orange or Fruit market, for example) so that the rules for each type of orange may be specified and analyzed separately.

Once the markets have been divided into appropriately small groups, the sub-markets may reference decider agreements that calculate whether or not a trade may be executed. This approach allows for a consistent market structure to be maintained with minimal changes, as only the lower-level decider agreements need be updated when the tradability rules change among the parties or within the markets. This also allows common market configuration patterns to be interpreted, reused and modified as necessary.

Constraints may also be used to represent position limiting agreements that limit trades based on the positions of the counterparties' to the trade, thereby disallowing trades that would cause a party's position in a particular instrument to exceed (or fall below) some configured or calculated threshold. The position volume limits may be implemented for both long and short positions on a per-instrument, per-counterparty basis. Some embodiments may include constraints that implement value-based limits, separate limiting for unrealized positions (current market value of open positions) and realized positions (total profit on all closed positions), per-company position limiting, and/or limiting volume or value over a rolling time period. Another implementation may delegate the exact calculation of the position limit to an external proprietary risk management algorithm that may also include portfolio management parameters that further define particular position limitations.

Top-Level Market Configuration

Referring to FIG. 1, structural agreement types are used to model and assign trading agreements into individual markets and model the market 100 as a directed graph of rules-based trading criteria, with each agreement being a node in the graph. In this example, the main agreement is a Cascade agreement 105. The first agreements referenced by (or dependent upon) the main Cascade agreement specifies global logic that applies to all instruments, counter parties, and periods within that market. In this case, for example, a Disallow Self Trading agreement 110 prevents trades from executing with the same party (e.g., traders from the same company) on both sides of the trade. This agreement will be processed before any other agreements, so it will be applied regardless of any other settings (which will not even be considered if the counter parties are both from the same company). Below the global logic, Instrument agreements perform the role of a market router 115, directing the tradability calculation to a dedicated set of trading agreements 120 for each market depending on the subject matter of the trade. Each market may then have its own Cascade agreement that further references the rules specific to that market.

Figure 2:
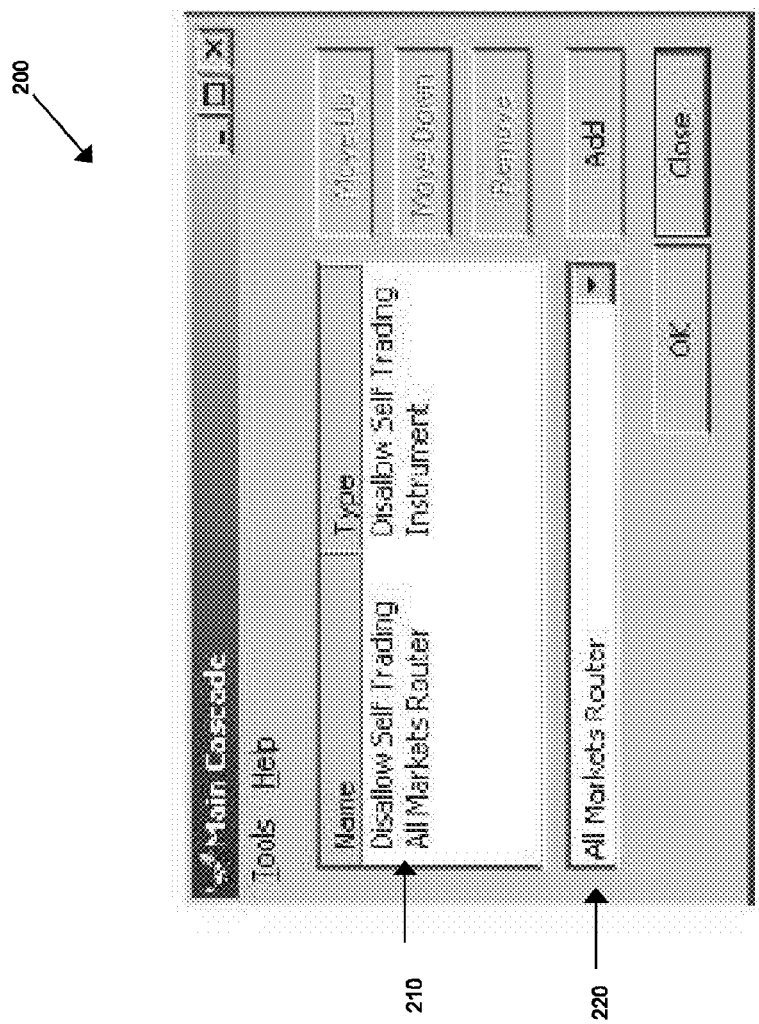
FIG. 2 illustrates a configuration screen used to implement a trading market modeled as a directed graph in accordance with one embodiment of the invention.

In this example, there are three markets: the fruit market 125, the rock market 130, and the flower market 135, each representing a different market that will typically have specific requirements for its trading rules. These examples will be used throughout this disclosure, but are for illustrative purposes only, as the market for any tradable good, financial instrument or obligation may be modeled using these techniques. FIG. 2 shows an exemplary configuration screen 200 of the main Cascade agreement for this market. In this configuration, this Cascade agreement only references the one agreement that provides global logic (the Disallow Self Trading agreement) and then references the All Markets router agreement. Each of the agreements for the market presented in a list 210 in order of execution. A drop-down list 220 allows a user to select additional agreement types, which may be added to the market and moved up or down in the graph sequence, as needed.

Figure 3:
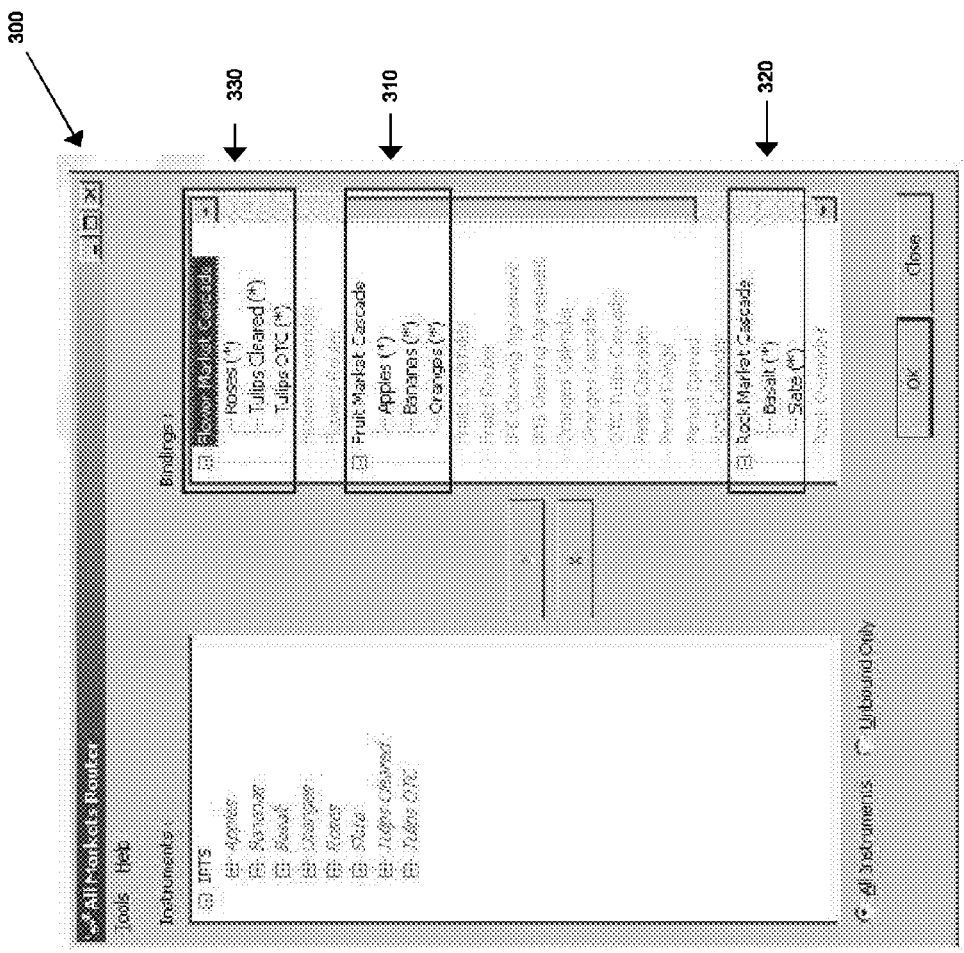
FIG. 3 illustrates a configuration screen used to implement trade routing agreements in accordance with one embodiment of the invention.

FIG. 3 illustrates an exemplary data entry and configuration screen 300 that may be used to define and review router agreements. This agreement binds the various Fruits instruments 310 (apples, bananas, and oranges) to the Fruit market Cascade agreement, the Rock 320 (basalt and slate) instruments to the Rock Market Cascade agreement, and the Flower instruments 330 (roses, tulips cleared and tulips over-the-counter ("OTC")) to the Flower Market Cascade agreement.

Figure 4:
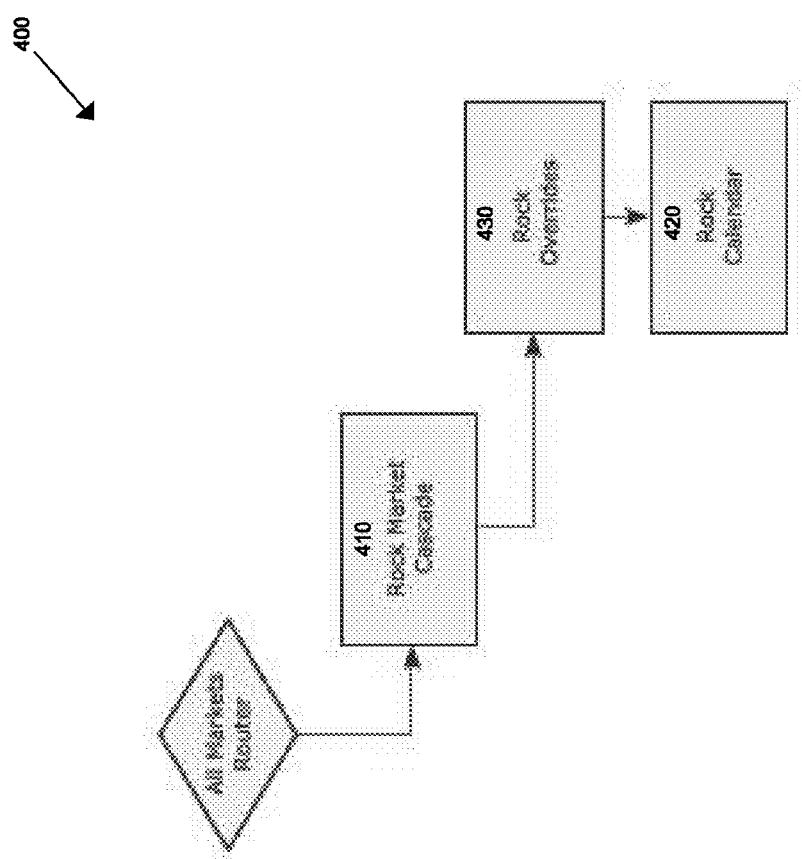
FIG. 4 illustrates a trading market modeled as a directed graph in accordance with one embodiment of the invention.

Referring again to FIG. 1, each distinct market has its own Cascade agreement, and the All Markets Router agreement 115 routes a trade to the corresponding market's Cascade agreement based on the instrument being traded. FIG. 4 illustrates the next level of configuration of the agreement graph, starting at the market Rock Market Cascade agreement 410. Each of the example markets may have its own unique requirements.

In this example, the Rock Market has straightforward requirements in that the same trading rules apply to all trades of Rock instruments. The Rock Market Cascade agreement can therefore reference the Rock instrument's decider agreements 420 and 430 directly, without the need for any intermediate levels. The section below entitled "Straightforward Market (No Sub-Markets)" describes the process for defining agreements for this type of market. In many cases, markets will be more complex, and will be divided into sub-markets. In the Fruit Markets example illustrated in FIG. 5, different rules are used for each of the individual Fruit instruments (apples, oranges and bananas), and is therefore divided into a series of sub-markets, as described in the section entitled "Instrument-Based Sub-Markets" below.

Once a market is divided into sub-markets, tradability rules are then defined and assigned to the sub-markets. The section entitled "Sub-Market Configuration" describes how to setup the agreements at this level. The example Flowers market is similar to the Fruits Market, but has different trading rules depending on the sequence being traded. The section entitled "Sequence-Based Sub-Market" describes how to set up agreements to divide the Flowers market into sub-markets based on instruments and sequences. The sections entitled "Cleared Markets" and "Comingled Market" introduce the concept of clearing and show how Clearing agreements can be integrated with the other OTC agreements within this structure.

Straightforward Market (No Sub-Markets)

Referring now to FIG. 4, the market structure 400 for the Rocks Market includes a Rock Market Cascade agreement 410 and sub-agreements specific to the Rock Market. Because, in this example, all trades involving rock instruments adhere to the same trading rules, the Rock Market Cascade agreement can directly reference the decider agreements without the need for any intermediate levels. In this setup, the Rock Calendar agreement 420 defines the general rules relating to the allowable time periods for trading on Rock instruments. For example, if two counter parties are allowed to trade Rocks one year out, an agreement may be added to the Rock Calendar agreement 420 configured to allow the counter parties to trade for one year.

The Rock Overrides Sequence Bilateral agreement 430 provides a mechanism to define specific overrides to trades that would otherwise be allowable. For example, if two counter parties can trade on all Rock instruments for a rolling 18 month period, but cannot trade the specific month of July 2008, this may be modeled by configuring the Rock Calendar agreement 420 to allow the counter parties to trade a rolling 18 month period, and then configure the Rock Overrides Sequence Bilateral agreement 430 to specifically prevent the counter parties from trading on the Rock instruments in July 2008.

In this configuration 400, override agreements are checked first, and then the Rock Calendar agreement 420 is checked as the Rock Overrides agreement 430 defers to the Rock Calendar agreement unless it contains specific overrides that apply to the counter parties, instrument, and period (or periods).

Instrument-Based Sub-Markets

Figure 5:
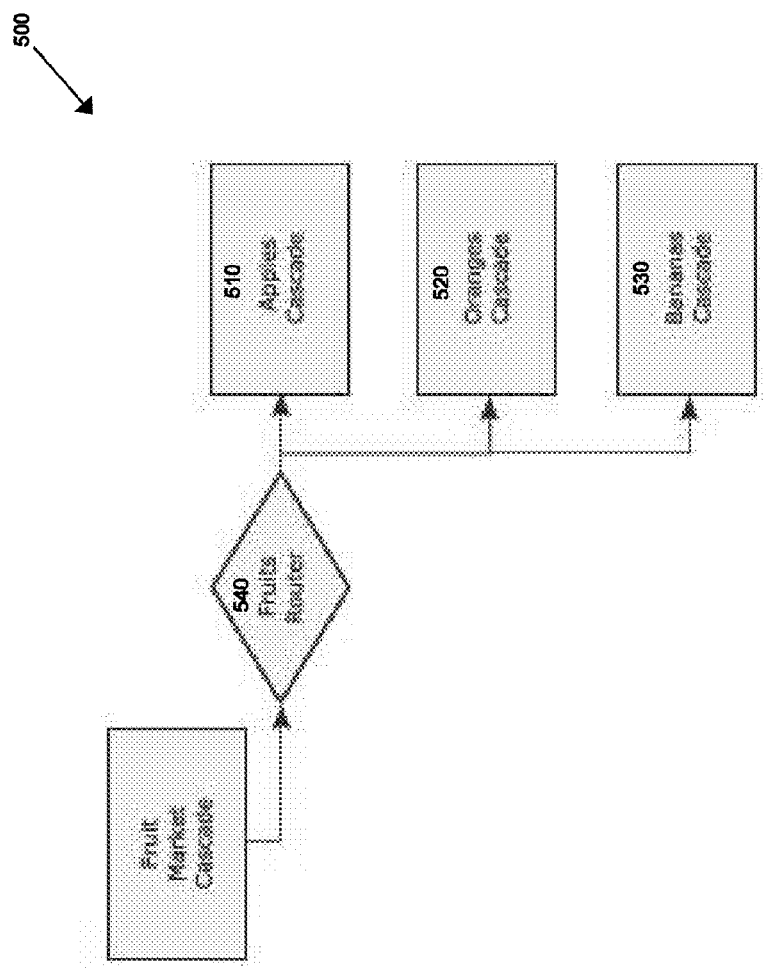
FIG. 5 illustrates a trading market modeled as a directed graph having multiple sub-markets in accordance with one embodiment of the invention.

In many cases, rules may be specified for the different instruments within a market, in which case the market may be divided into sub-markets, each further linking to agreements and constraints that define the sub-market. In one embodiment, a market is divided into sub-markets based on the individual instruments contained within it, whereas in other cases different groupings may be specified. For example, FIG. 5 illustrates how a Fruits Market 500 can be divided into sub-markets for each of the fruit instruments and individual cascade agreements defined for apples 510, oranges 520 and bananas 530. The Fruits Router 540 analyses the subject matter of a proposed trade and "routes" the trade to the appropriate sub-market based thereon.

Figure 6:
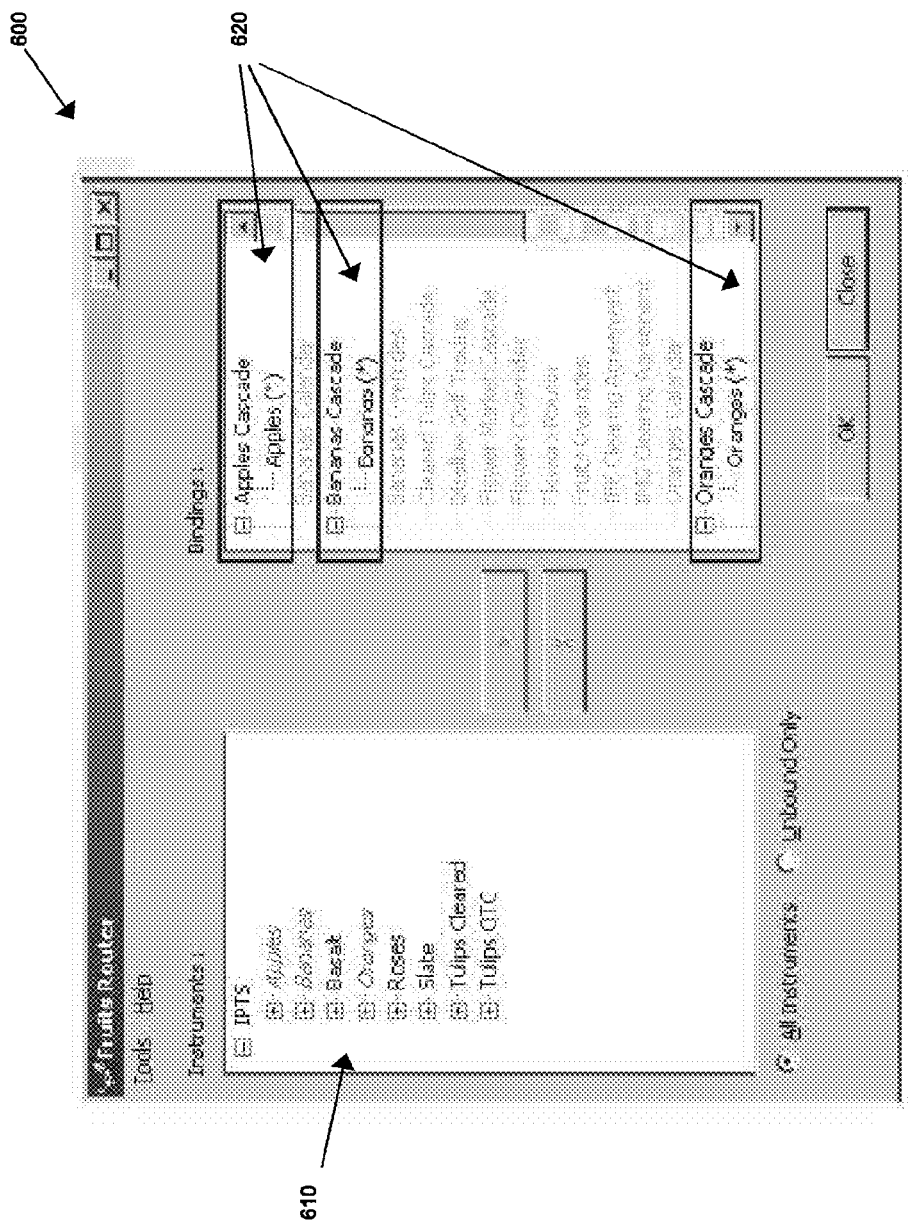
FIG. 6 illustrates a configuration screen used to implement trade routing agreements for a particular market in accordance with one embodiment of the invention.

FIG. 6 provides an exemplary screen capture 600 showing the definition of the Fruit Router agreement As shown in this example, an Instruments list 610 includes all the instruments defined within the trading system, but only the Fruit instruments (as shown in italics) are bound to agreements (so, for example, the Rock and Flower instruments shown in the list are not bound to agreements). For clarity, the relevant bindings have been outlined and highlighted in the Bindings list 620.

Sub-Market Configuration

Figure 7:
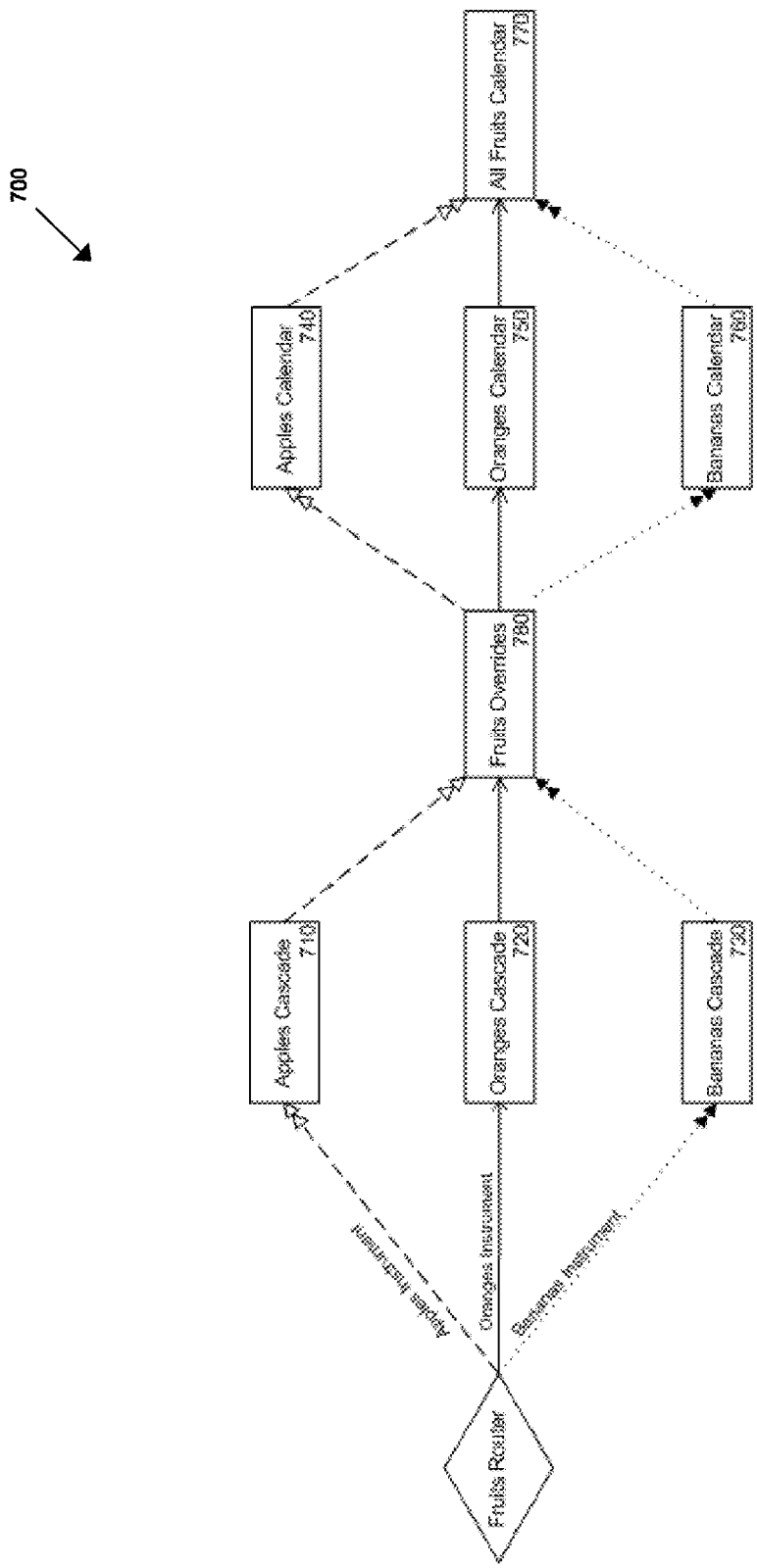
FIG. 7 illustrates a multi-market trading market modeled as a directed graph structure having multiple sub-markets in accordance with one embodiment of the invention.

When a market has been divided into appropriate sub-markets, each sub-market Cascade may then reference one or more decider agreements that ultimately determine the result of the tradability calculation. FIG. 7 shows one example of a sub-market configuration for the Fruits Market 700. The structure of each individual sub-market 710, 720, and 730 is similar to the Rocks Market described above as a straightforward market with no sub-markets.

Each Fruit Sub-Market has a fruit-specific Calendar 740, 750 and 760 associated therewith which defines any time or period-based trading constraints that are particular to that fruit (e.g., Oranges cannot be traded in February). The last agreement referenced by each sub-market Cascade agreement is the All Fruits Calendar agreement 770. This is the same actual agreement referenced by each Cascade. The All Fruits Calendar agreement 770 may be used to specify rules that apply across the Fruits markets. For example, if two counter parties can trade all the Fruits for the next 6 months, such an arrangement may be specified at this level.

Figure 8:
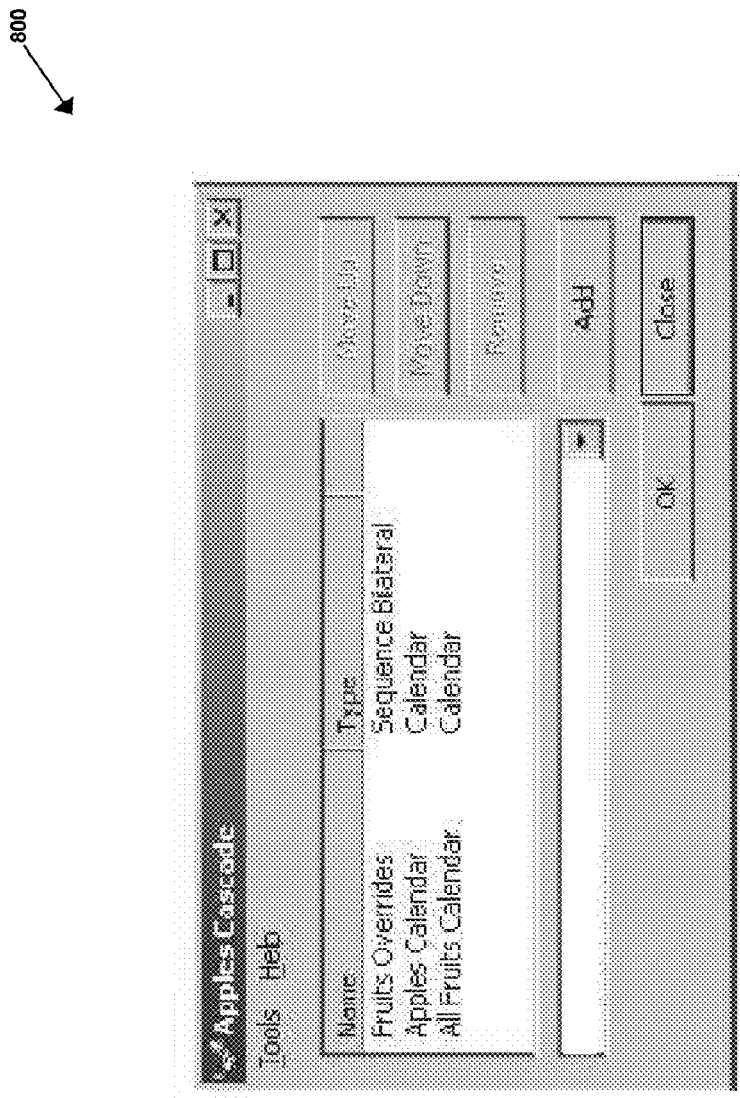
FIG. 8 illustrates a configuration screen used to implement a trading market having multiple trading calendars modeled as a directed graph in accordance with one embodiment of the invention.

For example, if two parties are allowed to trade Apples and Bananas, but not Oranges, for the next 12 months, this constraint can be specified in the Apples Calendar 740, and the Bananas Calendar 760. The first agreement referenced by the sub-market Cascade agreements is the Fruits Overrides Sequence Bilateral agreement 780. This is the same actual agreement referenced by each Cascade. This agreement may be used to override the other settings. For example, if the relationship between two parties needs to be modified so that they can specifically not trade in August 2008, this may be specified in the Fruit Overrides agreement 780. FIG. 8 illustrates the Apples Cascade as presented in an exemplary market definition and configuration screen 800.

Sequence-Based Sub-Market

Figure 9:
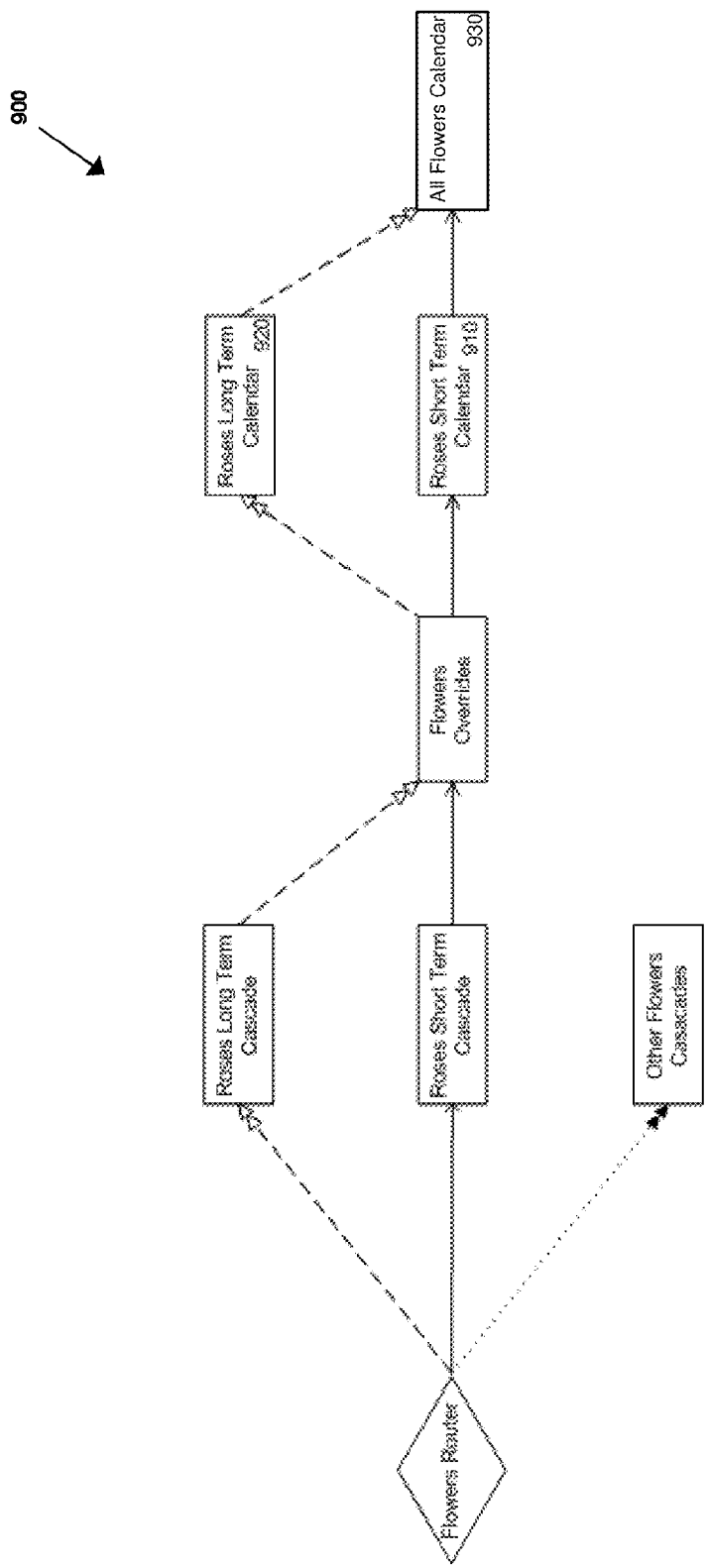
FIG. 9 illustrates a sequence-based market modeled as a directed graph structure with multiple markets and sub-markets in accordance with one embodiment of the invention.

Referring to FIG. 9, the trading rules within certain markets may require multiple sub-markets for a single instrument depending on various trading parameters. In the Flowers market 900, for example, Roses may trade both in the short term (Days/Weeks) and also in the long term (Months/Quarters), requiring different tradability rules for short term trades as opposed to long term trades. In such cases, two separate calendars are defined, one for long term trades and one for short term trades.

Figure 10:
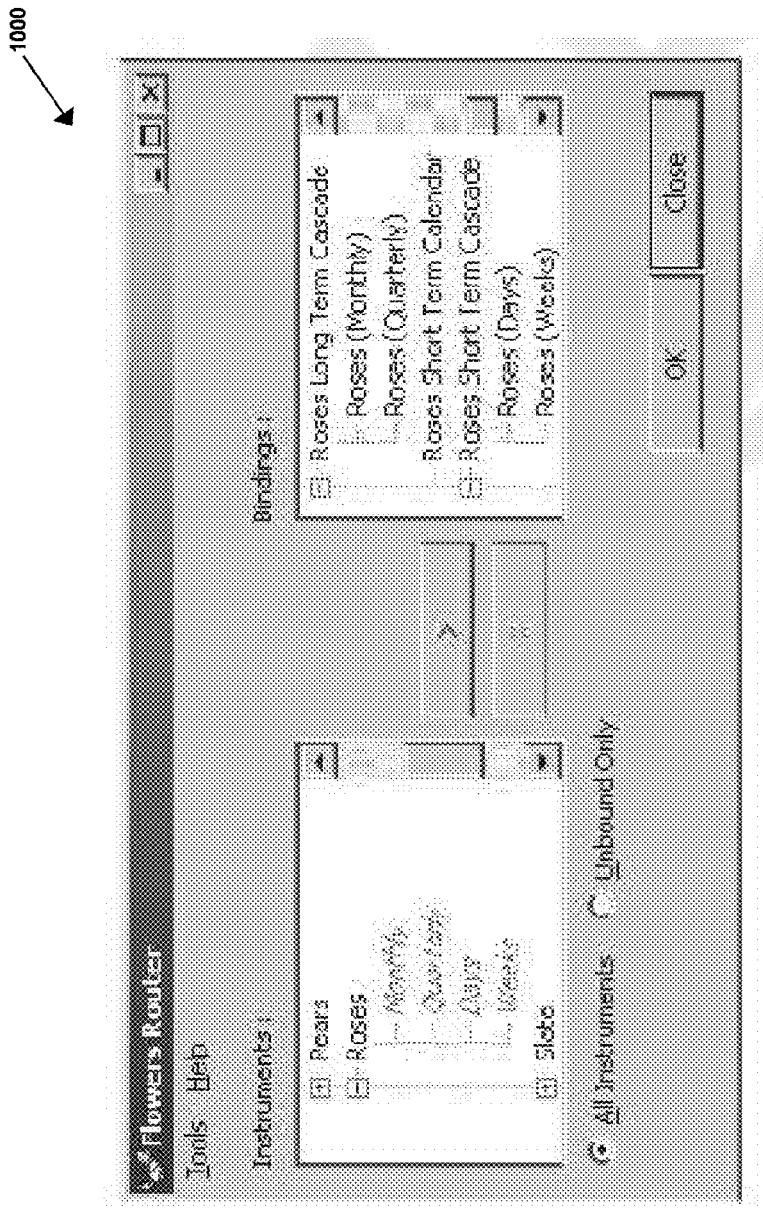
FIG. 10 illustrates a configuration screen used to implement trade routing agreements with time-based constraints in accordance with one embodiment of the invention.

To allow a party to trade roses only in the short term, the Roses Short Term Calendar 910 is modified to include the relevant periods, whereas the rules for parties trading roses in the long term would be specified in the Roses Long Term Calendar agreement 920. In instances in which a party has the same rules for all the markets (in this example, both Roses Short and Long Term), such rules may be defined in the All Flowers Calendar agreement 930, to which all flower trades default if no other agreements are applicable. FIG. 10 is an example of a router definition and configuration screen 1000 illustrating how the parameters for the Flowers Router appears with the different time-based constraints.

Alternative Approach to Sequence-Based Rules

Figure 11:
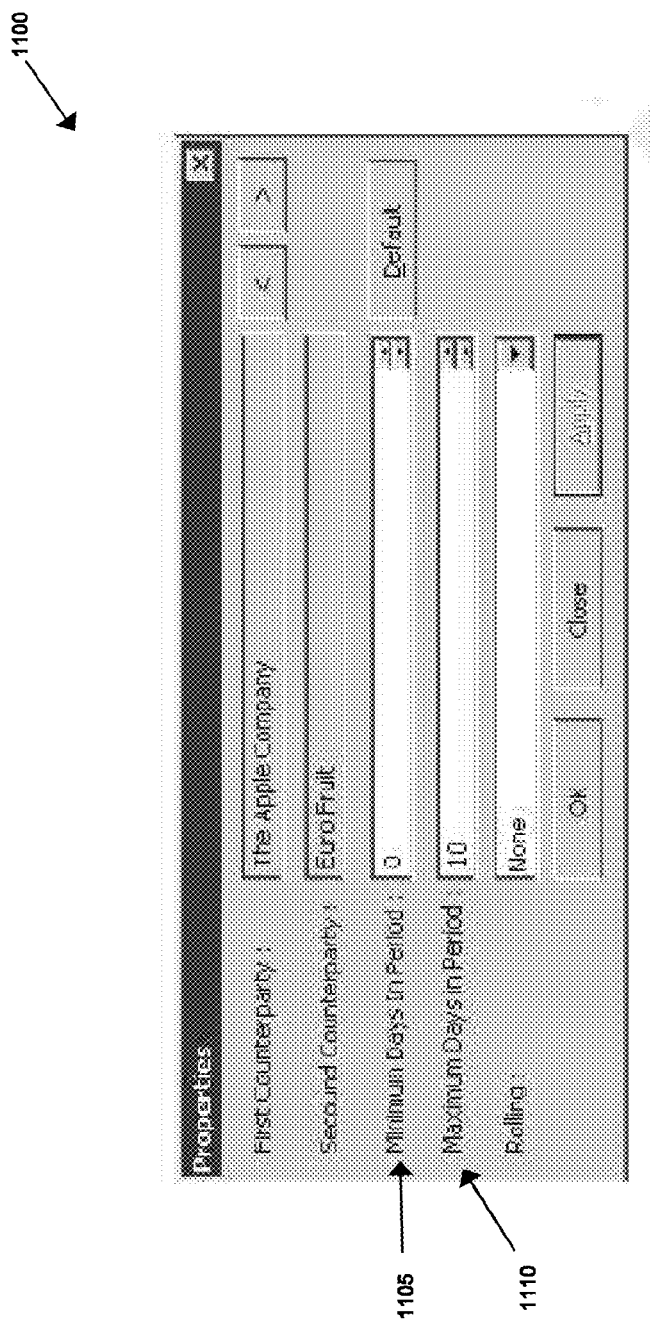
FIG. 11 illustrates a configuration screen used to implement trade period parameters in accordance with one embodiment of the invention.

Referring to FIG. 11, in some alternative embodiments, different rules for different trading periods may be implemented using a calendar agreement 1100 that only applies to periods of a certain duration. In such cases, the calendar agreement may include multiple "rows"—one for each period—and each row includes a Minimum Days In Period 1105 setting and a Maximum Days In Period 1110 setting. The date ranges on that row are applied to sequence items (periods) where the number of days in the period is greater than the minimum value and less than the maximum value. For example, setting the Minimum Days In Period to 0 and the Maximum Days In Period to 10 for a given row in a calendar agreement ensures that the settings on that row only apply to Days and Weeks periods (i.e., periods of less than ten days), and not to any Quarters or Months periods, because months and quarters have more than ten days.

In cases in which there are only a few counter parties with different trading rules for different types of sequence, it may be easier to configure this by setting the minimum and maximum days in periods. However, if there are a large number of counter parties with different trading rules for different periods, then the sub-markets approach described above may be used.

In some implementations, the sequencing of the agreements may be influenced by incorporating a "defer" decision option for certain agreements. In such cases, a trading agreement may explicitly state whether, given a set of trading parameters, the trade is to be allowed, disallowed, or left to another trading agreement to decide. If all agreements along the sequence for a particular trade return a 'deferred' result, that sequence-based agreement can either derive its own tradability result or itself return a result of 'deferred'

Cleared Markets

Figure 12:
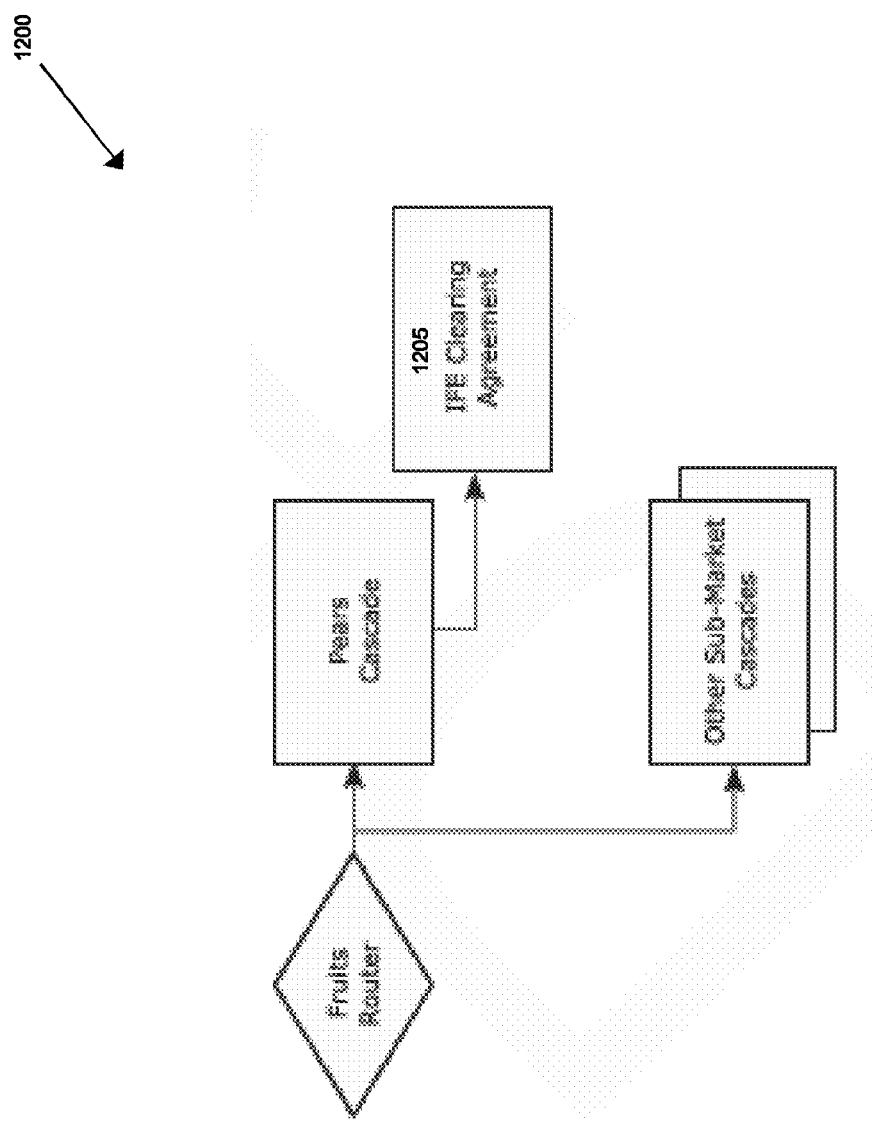
FIG. 12 illustrates a market including a clearing agreement modeled as a directed graph structure in accordance with one embodiment of the invention.
Figure 13:
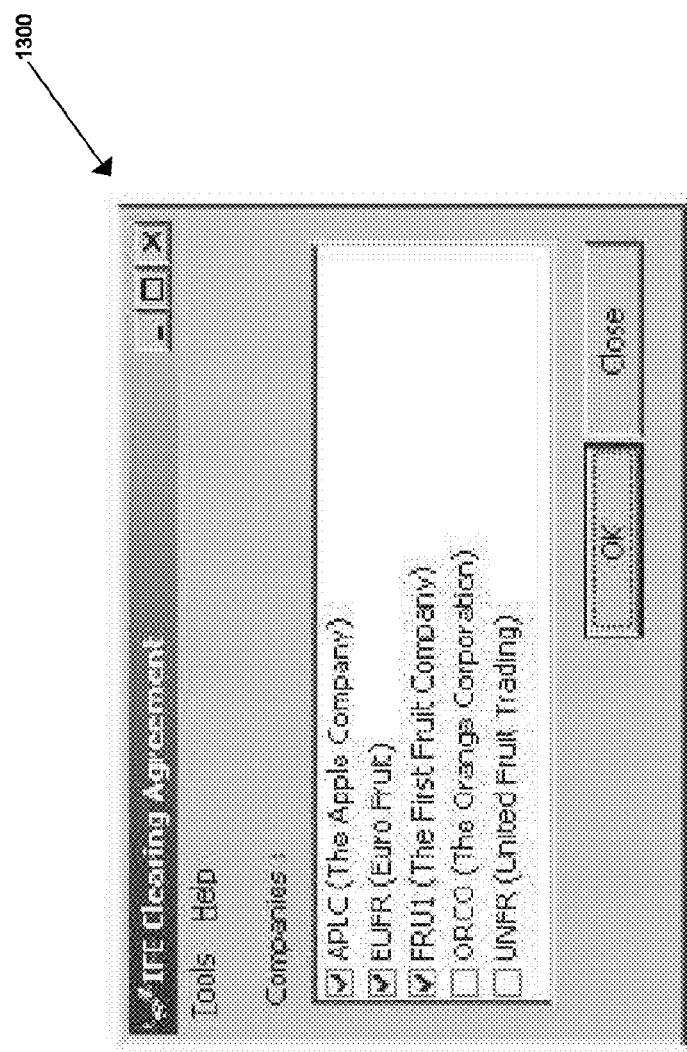
FIG. 13 illustrates a configuration screen for applying clearing agreements to market participants in accordance with one embodiment of the invention.

The above examples all focus specifically on Over The Counter ("OTC") trading, in which the parties trade directly with each other. Some markets, however, require a clearing process in which a third party clearing house acts as an intermediary between the trading parties. In such cases, a Clearing agreement may be defined to specify which counter parties are members of a given clearing house. FIG. 12 illustrates one possible market structure 1200 of a cleared market in which all instruments in the Pears market must satisfy a Clearing agreement 1205 prior to being deemed tradable. Because all pears instruments trade through one clearing agreement, the Pears Cascade agreement contains a single Clearing agreement (the IFE Clearing agreement). FIG. 13 is an exemplary screen capture of an input screen 1300 in which trading counter parties are assigned to a Clearing agreement. In this example, counter parties APLC, EUFR, and FRU1 are members of this clearing house ("IFE Clearing") and therefore all three parties are cleared to trade the pears instruments with each other. As a result, APLC can trade with EUFR and FRU1, EUFR can trade with APLC and FRU1, and FRU1 can trade with APLC and EUFR.

The unticked counter parties are not members of the IFE and therefore cannot trade the Pears instruments. In some embodiments, more than one market may use the same clearing house. In such cases, a single instance of the Clearing agreement may be defined for the clearing house and added to the Cascade agreements where it is required. As a result, if the membership of the clearing house changes (e.g., parties initiate or terminate membership), only one agreement need be updated and the updates are automatically applied to all markets where that agreement is used.

Figure 14:
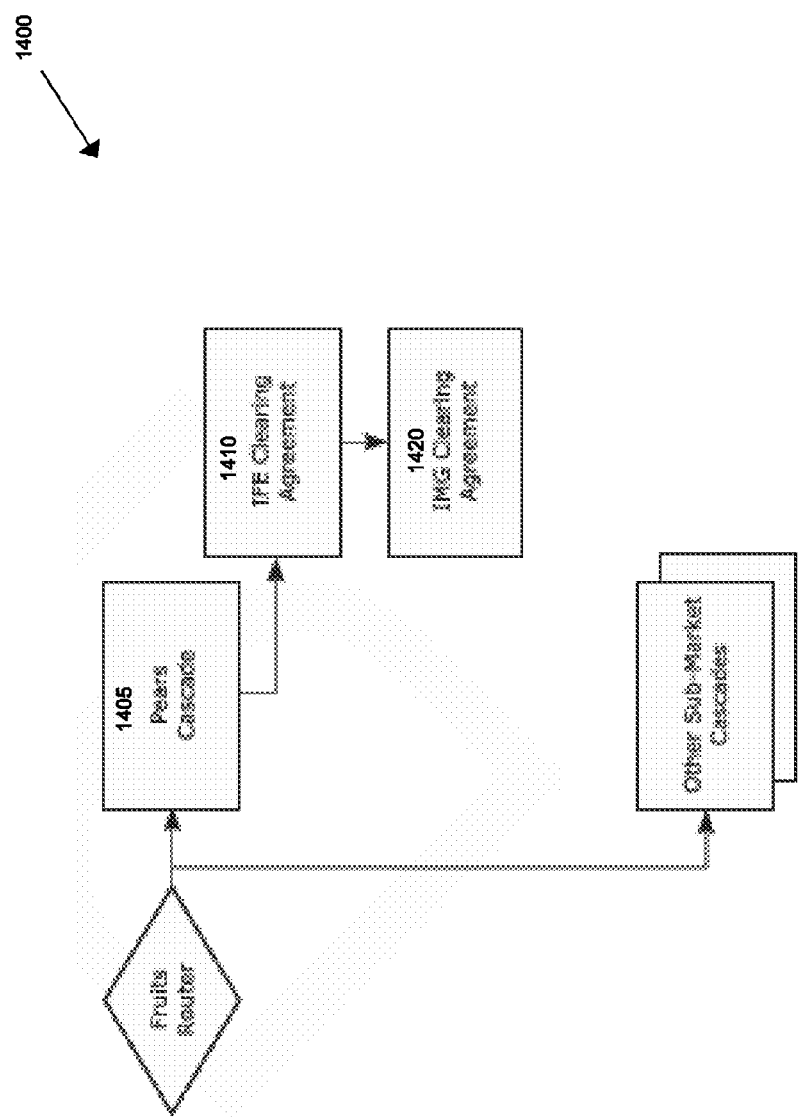
FIG. 14 illustrates a market modeled as a directed graph structure that includes multiple clearing agreements in accordance with one embodiment of the invention.
Figure 15:
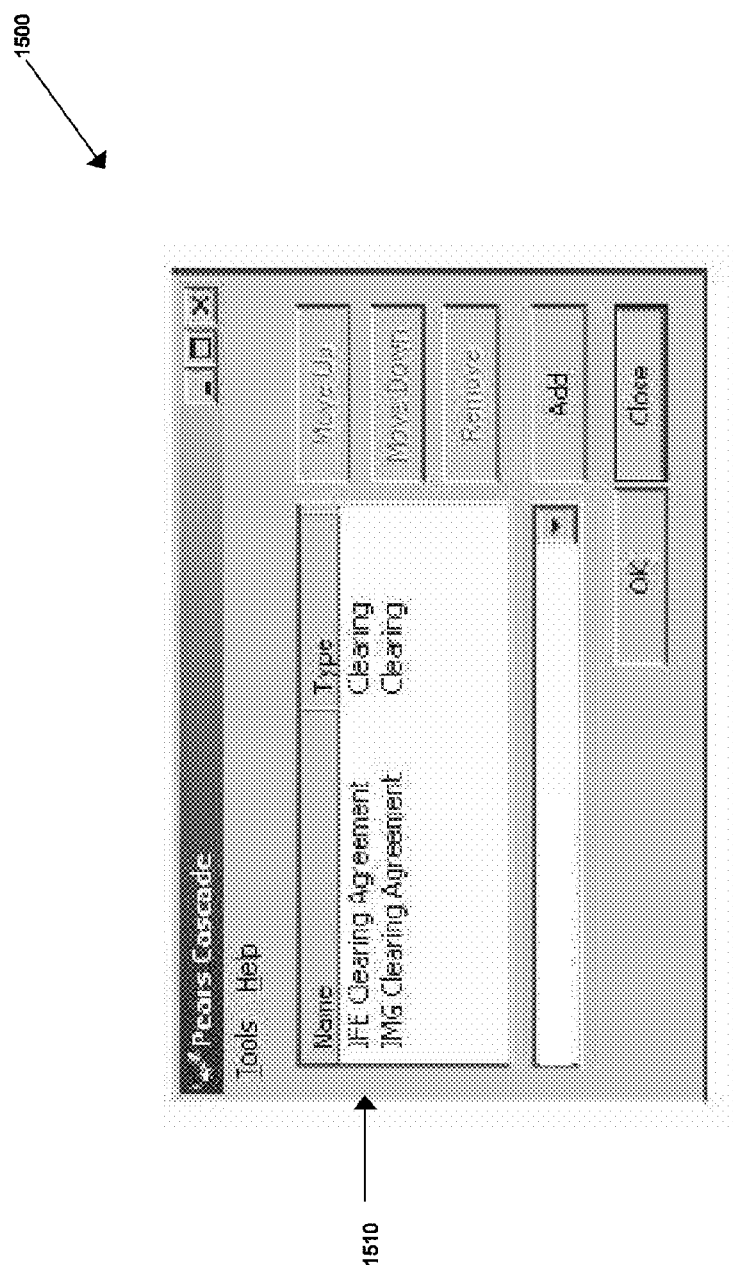
FIG. 15 illustrates a configuration screen that facilitates the ordering and assignment of clearing agreements in accordance with one embodiment of the invention.

In some cases, multiple clearing houses may be used in the same market. FIG. 14 illustrates one such market structure 1400 in which the Pears market 1405 can use one of two Clearing agreements, either the IFE agreement 1410 or the IMG agreement 1420. In this configuration, there are two Clearing agreements, one for each of the two clearing houses that are used in the pears market. In this instance, the IFE clearing house has precedence over IMG. FIG. 15 is an exemplary configuration screen 1500 for associating the two Clearing agreements 1510 with the Pears Cascade agreement to enforce these constraints.

The two clearing houses are listed in the order in which they are checked. With this configuration, the system will first check whether the counter parties are members of the IFE clearing house. If both counter parties are members of the IFE, then this agreement is satisfied, and the two parties will be allowed to trade pears instruments. If, however, neither counter party is a member of the IFE (or if only one counter party is a member of the IFE) then the system will defer to the IMG clearing house, and will allow the counter parties to trade if they are both members of that clearing house. If neither counter party is a member of the IMG clearing house (or if only one counter party is a member of the IMG) then they will not be able to trade and in this example the trade will be deemed unexecutable.

Figure 16:
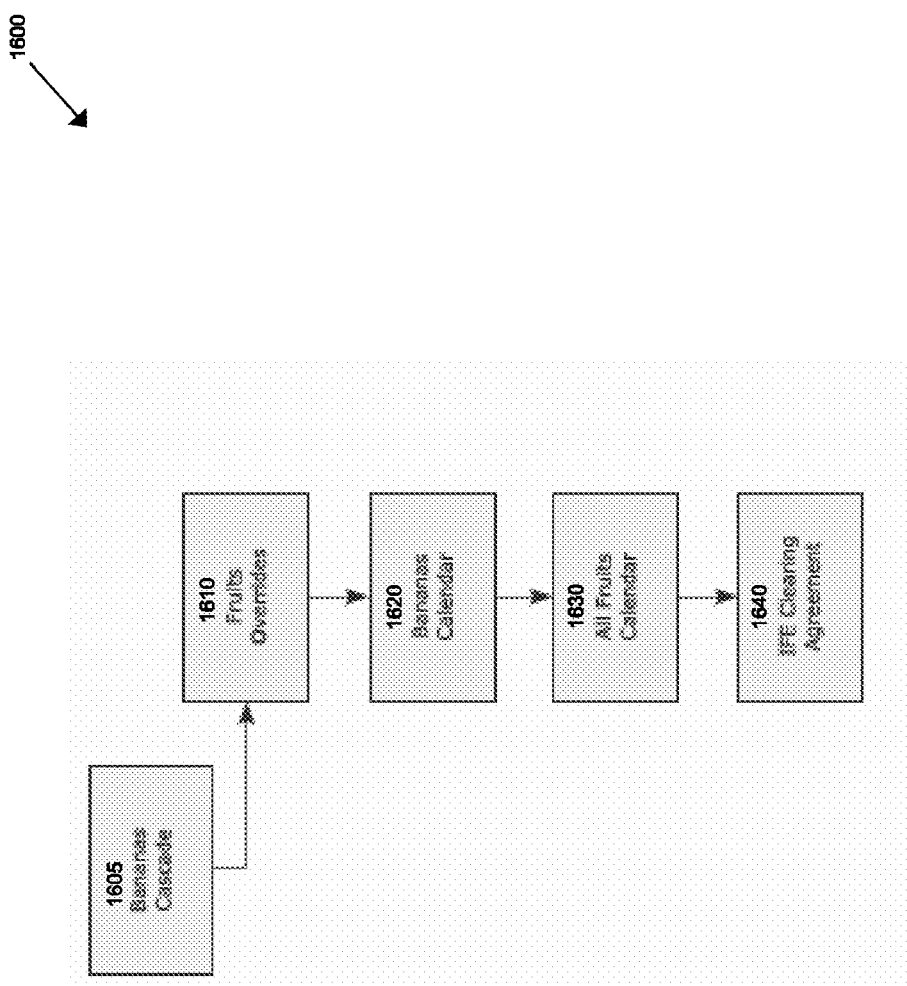
FIG. 16 illustrates a market modeled as a directed graph structure that includes a market override agreement in accordance with one embodiment of the invention.

In some implementations, OTC and cleared agreements may be applied to the same instruments, creating a "comingled" market, as shown in FIG. 16. In this example market structure 1600, the Bananas market 1605 is configured to use comingled OTC and cleared agreements. With this configuration, the Fruits Override OTC 1610 and Calendar agreements 1620, 1630 are checked first, and then if an OTC relationship does not exist, a check is made to determine if the counter parties are members of the IFE clearing house 1640.

Spreads, Ranges, and Combinations

Figure 17:
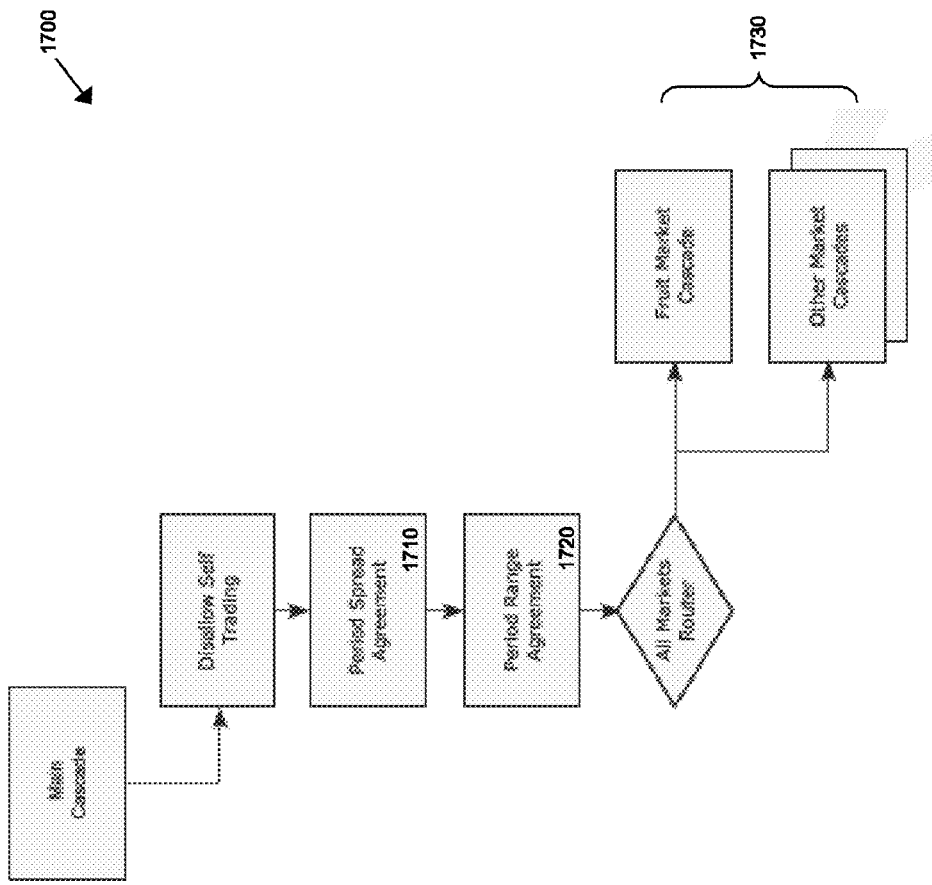
FIG. 17 illustrates a market modeled as a directed graph structure that includes spread and range agreements in accordance with one embodiment of the invention.
Figure 18:
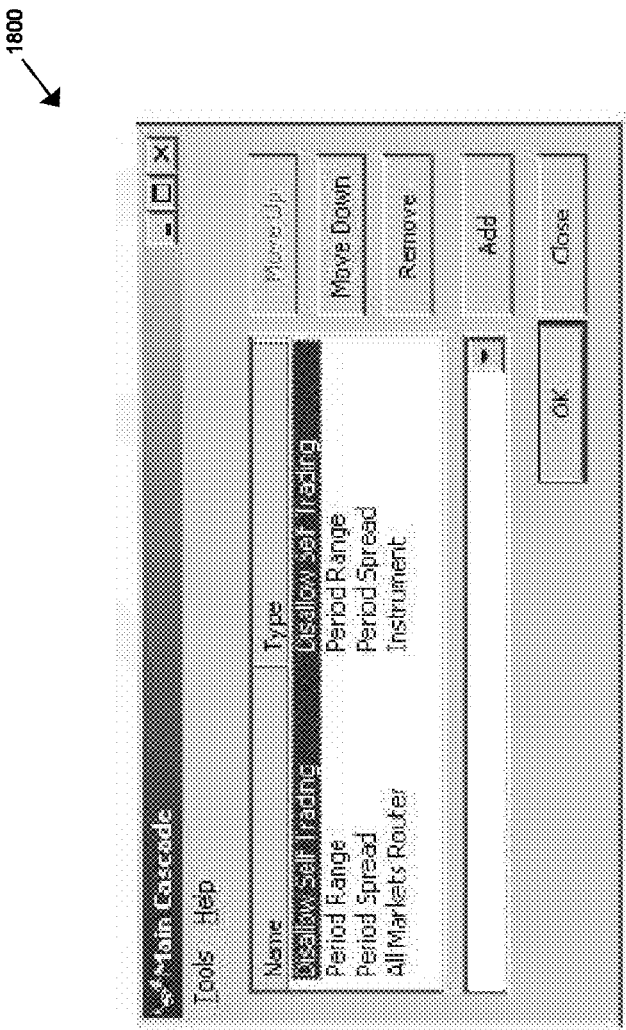
FIG. 18 illustrates a configuration screen implementing the spread and range agreements of FIG. 17.

Many markets contain Spreads, Ranges and Combination instruments, which allow trades to be split into two or more "legs" such that the tradability analysis is performed on each leg independently. In some cases, the counter parties are only allowed to trade if both (or all) individual tradability checks return a positive result. In other instances, only a subset of positive results (e.g., a minimum number, a percentage, and/or certain specific results combined with a minimum number) may be sufficient to allow execution. By placing Period Spread, Period Range, and Combination agreements as high in the graph as possible, all spreads ranges and combinations that can be split into separate legs are so split for the purposes of calculating tradability. FIG. 17 illustrates one such market structure 1700 in which a Period Spread agreement 1710 and Period Range agreement 1720 are included in the global logic at the top-level of the market agreement graph, and therefore analyzed before trades are routed to instrument-specific markets 1730. FIG. 18 provides an exemplary configuration screen 1800 implementing the market structure of FIG. 17.

Cleared/OTC Spreads

Figure 19:
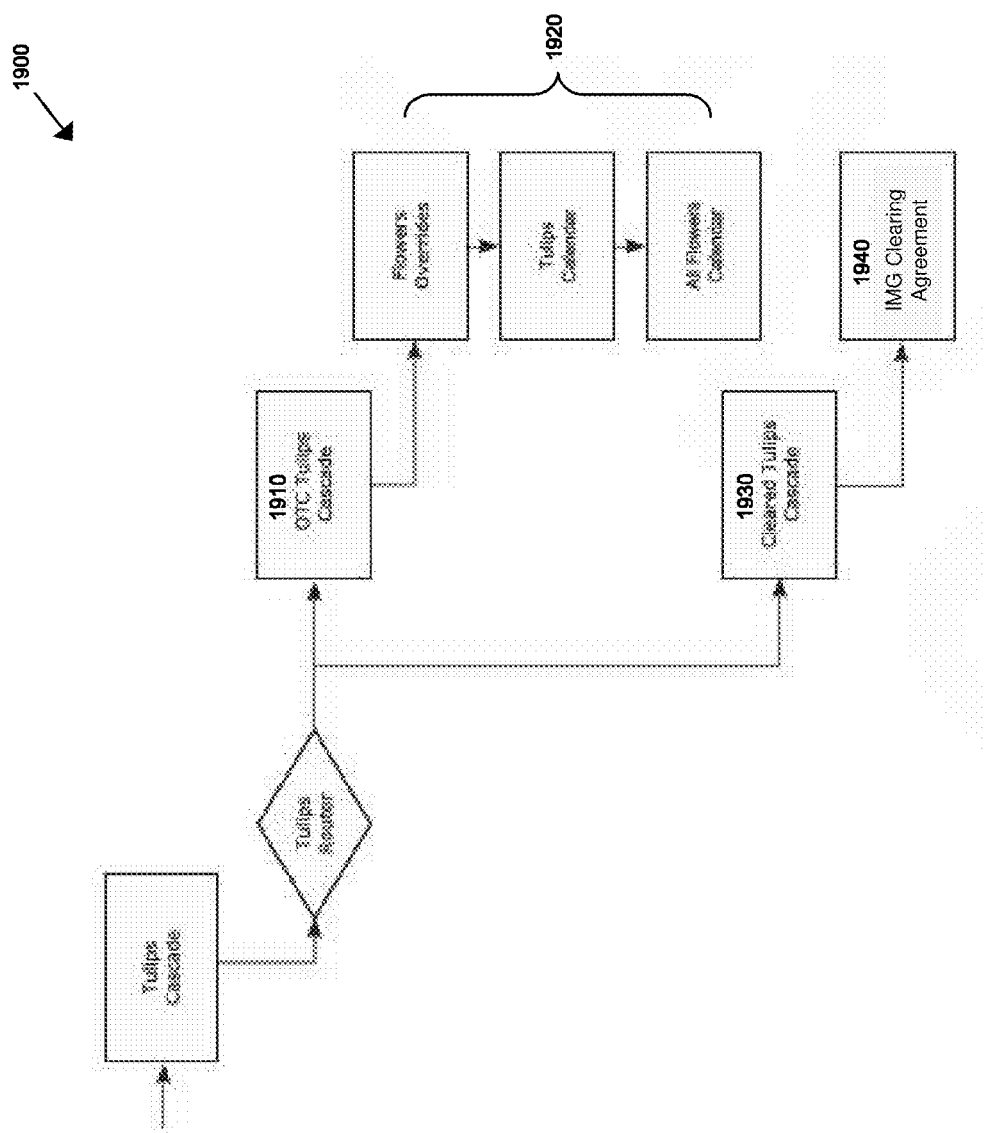
FIG. 19 illustrates a market modeled as a directed graph structure that permits trades via over-the-counter and clearing agreements in accordance with one embodiment of the invention.
Figure 20:
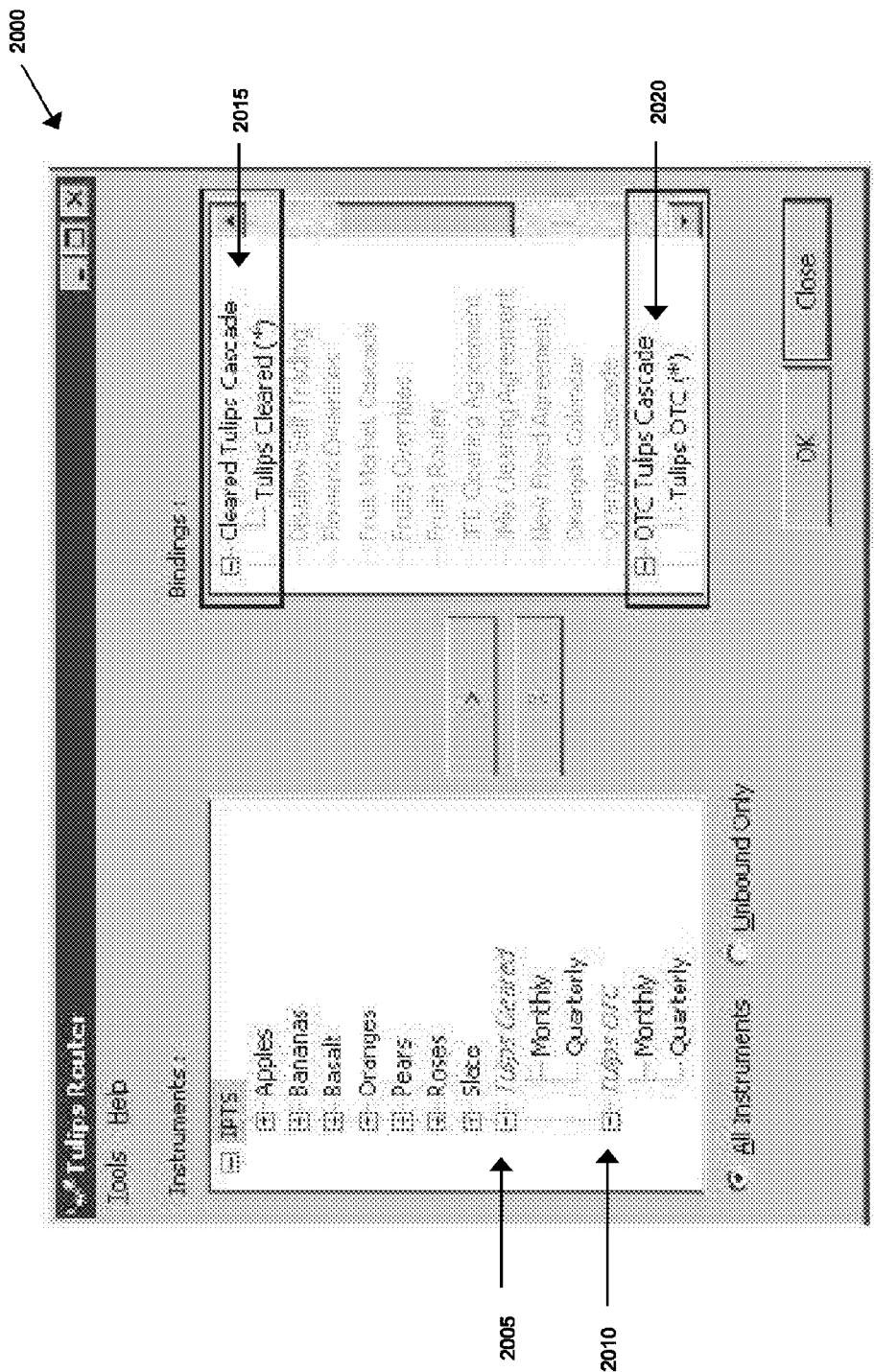
FIG. 20 illustrates a configuration screen implementing the directed graph market structure of FIG. 19.

In some markets, spreads may be defined between cleared and OTC instruments by using the Period Spread agreement type. For example, FIG. 19 illustrates how the Tulips Market 1900 includes instruments that may be either traded OTC or cleared through the IMG clearing house. In this configuration, tradability for OTC Tulips instruments is determined based on the decider agreements 1920 referenced by the OTC Tulips Cascade agreement 1910, while Cleared Tulips instruments routed to the Cleared Tulips Cascade 1930 are tradable among counter parties who are members of the IMG clearing house, as defined by the IMG Clearing agreement 1940. FIG. 20 provides an exemplary configuration screen 2000 in which the Tulips Cleared instrument 2005 is bound to the Cleared Tulips Cascade agreement 2015, and the Tulips OTC instrument 2010 is bound to the OTC Tulips Cascade agreement 2020.

Figure 21:
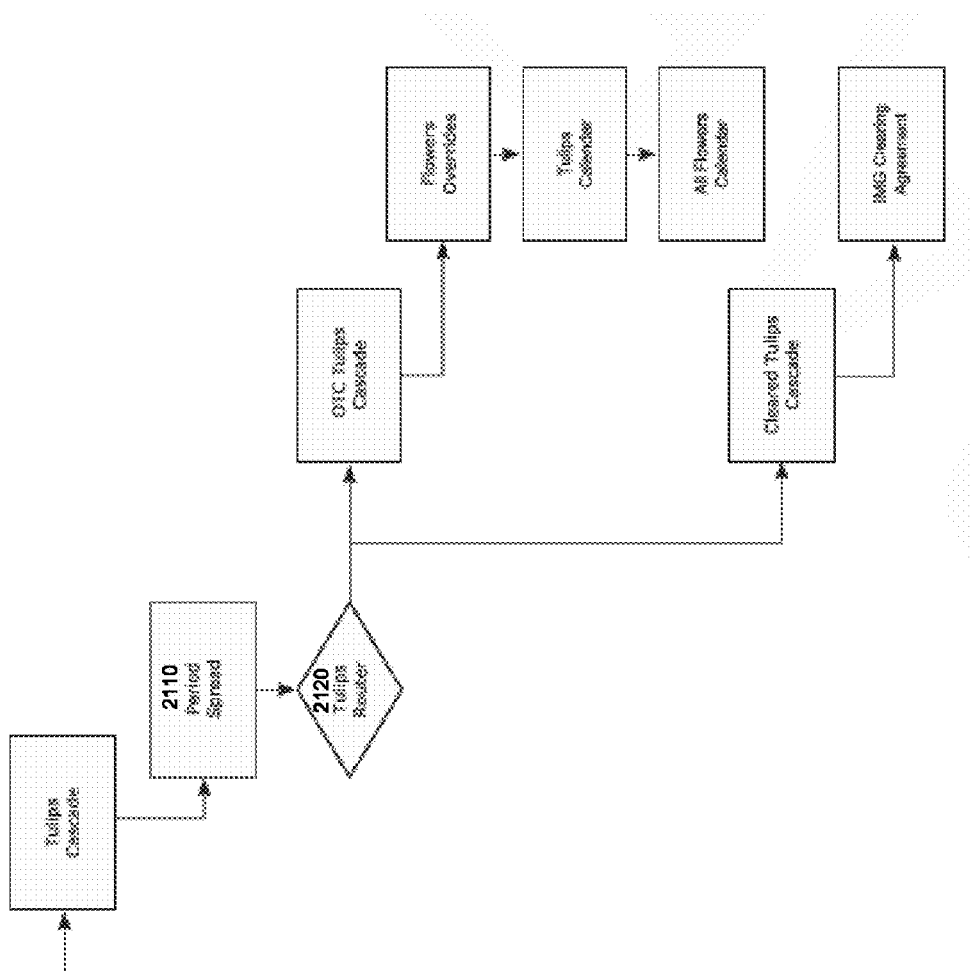
FIG. 21 illustrates a market modeled as a directed graph structure that permits the use of multiple trading calendars for instruments that trade over-the-counter and via a clearing agreement in accordance with one embodiment of the invention.

In cases in which a trade may be split into multiple legs having different trading rules (e.g., one leg may be traded OTC and others through clearing agreements), spreads may be used between the OTC and cleared instruments. As shown in FIG. 21, the market may be configured such that a Period Spread agreement 2110 is analyzed before a trade is seen by the Tulips router 2120. Once split, the tradability of each trade leg is analyzed independently as described above. The effect of the Period Spread Agreement 2110 is to split the proposed trades into each of its legs and then perform a tradability calculation on each leg individually, meaning that the OTC component of the spread will be treated as an OTC price and the Cleared price is treated separately.

Modifying Trade Parameters

In some implementations, the agreements may also define certain rules for modifying trade parameters and/or actioning (also referred to as executing) the trade. For example, in order to fulfill an order according to a trader's preferences, or to increase the probability that a trade is deemed executable, the trader may be willing to have aspects of a trade modified and/or indicate a preferred sequence that certain parameters be modified. In such a case, an agreement may be used to indicate that one or more of the trade parameters can be changed (e.g., have another party conduct the trade on behalf of one of the counterparties). In some cases, a new intermediary party may be identified as a "sleeving" party, and the trade re-evaluated through the graph with the new intermediary party as the trade initiator. Often, trades are "sleeved" in order to take advantage of credit agreements that exist between certain parties. For example, if party P1 wishes to trade with party P2, but no formal agreement exists that allows P1 and P2 to trade, the trade may be "sleeved" through a third party P3 that has such agreements with P1 and P2. In such cases, P3 acts as a neutral third party that facilitates trades among P1 and P2, often for a fee. In other cases it may be necessary to "sleeve" certain trades through particular trading parties due to geographical constraints, such as a lack of direct logistical arrangements between two counterparites. In such a case a trade may be conducted indirectly through a trader that has the necessary logistical arrangements with each of the original trade counterparties in order for that trade to be executable.

In the example above, a party may define a "sleever" agreement to indicate that it will allow (or in some cases prefer) the trade to be conducted indirectly, with a third-party sleever conducting trades on its behalf. When analyzed, the sleever agreement looks for one or more sleever parties that have established "tradability" with the trade initiator (also referred to as the "trade aggressor"). In one implementation, sleever candidates may be presented as a configurable sub-list of all the traders in a particular market, whereas in other cases the list of available sleever candidates may be different for each aggressor trader. The trade is then analyzed by recursively reevaluating the relevant constraints for the trade with the sleever candidate as the trade aggressor.

As described above, a sleeving agreement can directly affect the trade as it is executed. In one implementation, a trade is divided into "sleeving legs" or trade portions. For example, a trade may be divided into one portion representing the sleever and the trade counterparty and another portion representing the original aggressor and the sleever. Because the first leg of the trade is re-analyzed using the directed graph and the sleever as the aggressor, it is possible that a subsequent sleever (depending on the new sleeving aggressor's trading preferences) will be identified, effectively creating a chain of sleeve trades to perform the trade. In some instances, parties may limit to the number of sleeves that may be used to complete a trade.

In one implementation, a sleeving agreement may be defined as an alternative to cleared/OTC for co-mingled instruments such that direct trading is a first choice (OTC), then sleeving, then clearing as a final recourse when dealing within a particular market.

Figure 22:
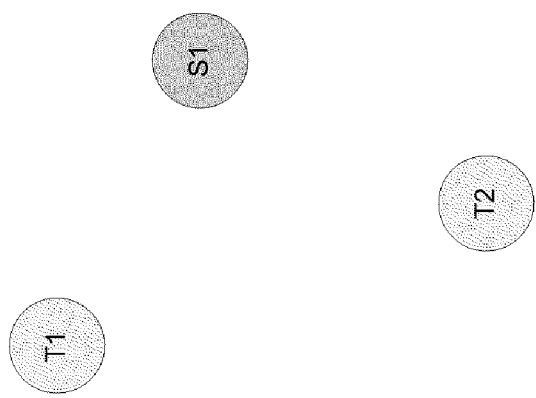
FIG. 22 illustrates an exemplary market having two trading partners and a third-party sleever in accordance with one embodiment of the invention.
Figure 23:
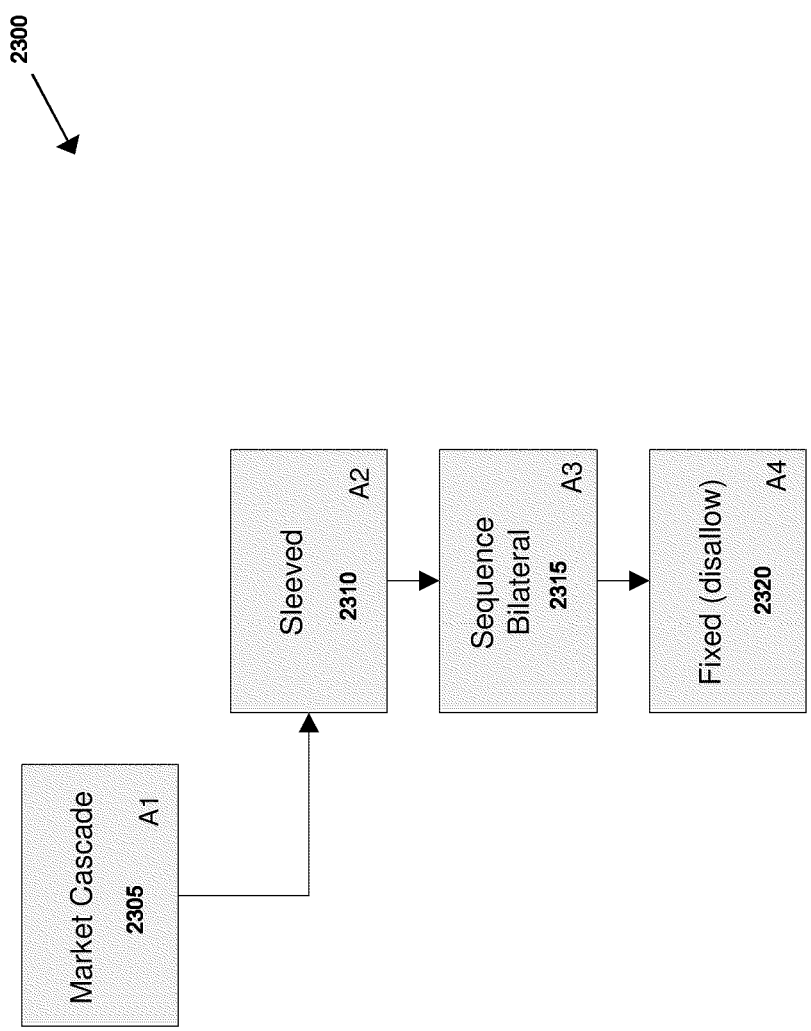
FIG. 23 illustrates a market modeled as a directed graph structure that includes sleeving agreements in accordance with one embodiment of the invention.

The following example is based on the simple market configuration illustrated in FIG. 22 and FIG. 23. In FIG. 22, T1 and T2 represent traders in a proposed trade, and S1 represents a trader that has agreed to act as a candidate sleever. The sleeving agreement facilitates this arrangement by incorporating S1 into the set of traders' candidate sleevers. As shown in FIG. 23, trade information is provided to the root cascade 2305, which sequentially invokes and analyzes constraints 2310, 2315 and 2320 and combines the results to evaluate the trade.

In this configuration, sleeving is attempted for all trades because constraint 2310 is the first constraint analyzed. The list of candidate sleevers and traders that have sleeving enabled is associated with the sleeved agreement 2310. The sequence bilateral agreement 2315 provides a finer-grained control of the direct lines of tradability between specific counterparty pairs on individual instruments, as detailed below. The fixed constraint 2320 ensures that if no tradability decision has been made (i.e., the decision has been deferred) by the time the decision passes through both constraints 2310 and 2315, an order will be deemed untradeable and not executed.

Figure 24:
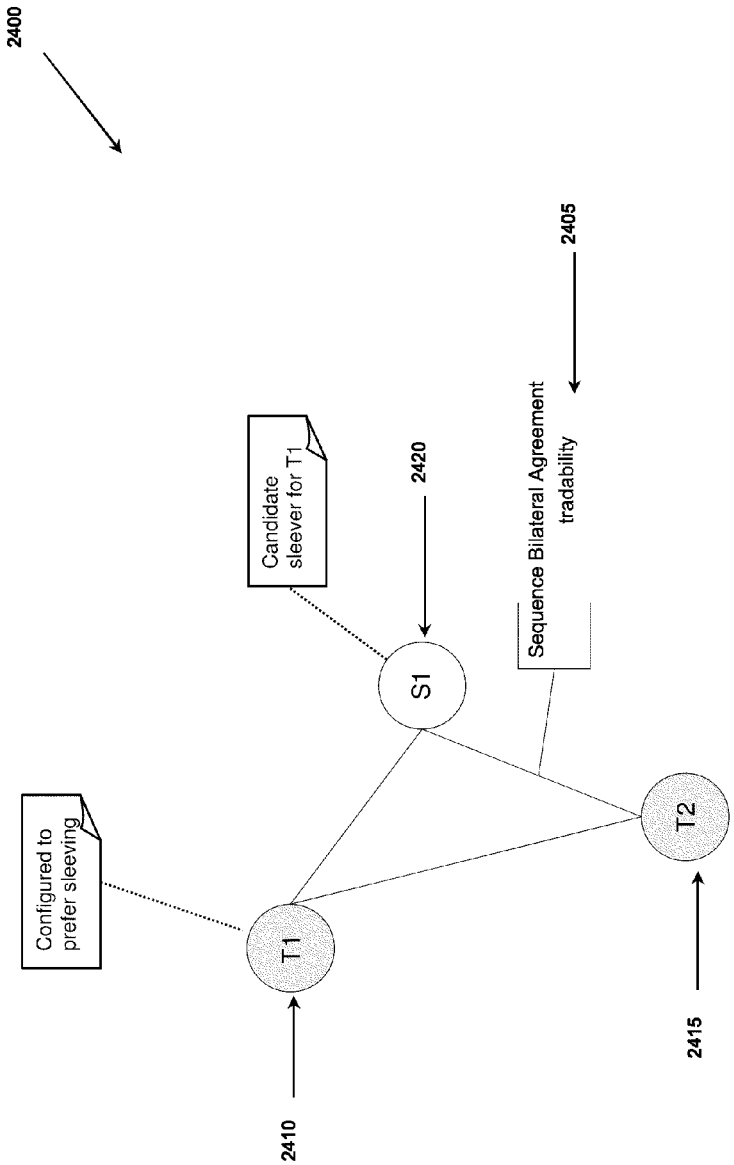
FIG. 24 illustrates the possible trading paths among the market participants of FIG. 22.
Figure 25:
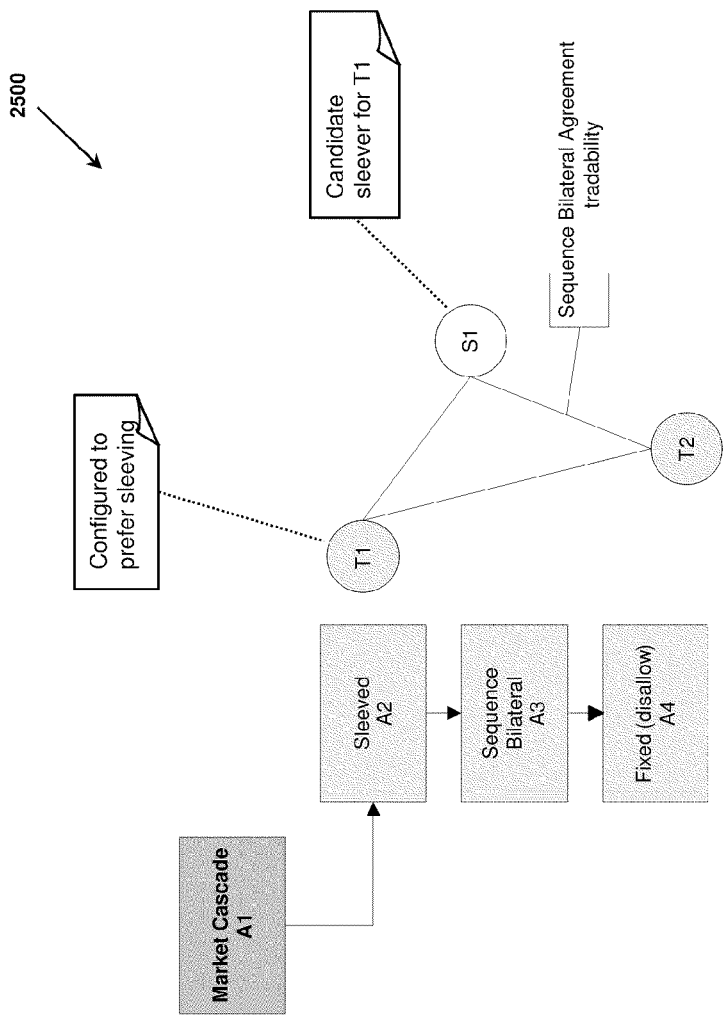
FIG. 25 illustrates how an exemplary trade is analyzed using the market structure of FIG. 23 and the trading paths of FIG. 24.

FIG. 24 illustrates a summary of the tradability paths among the parties, with the solid lines indicating direct tradability configured in sequence bilateral constraint 2405—in this example traders T1 (2410) and T2 (2415) may trade directly with each other. Note that even though sequence bilateral agreement 2405 provides trader T1 with direct tradability with trader T2, the system is configured in such a way that the trader would prefer to sleeve the trade through sleeve trader S1 when possible. FIG. 25 illustrates how the tradability paths follow the agreement structure dictated by the directed graph 2500.

Figure 26:
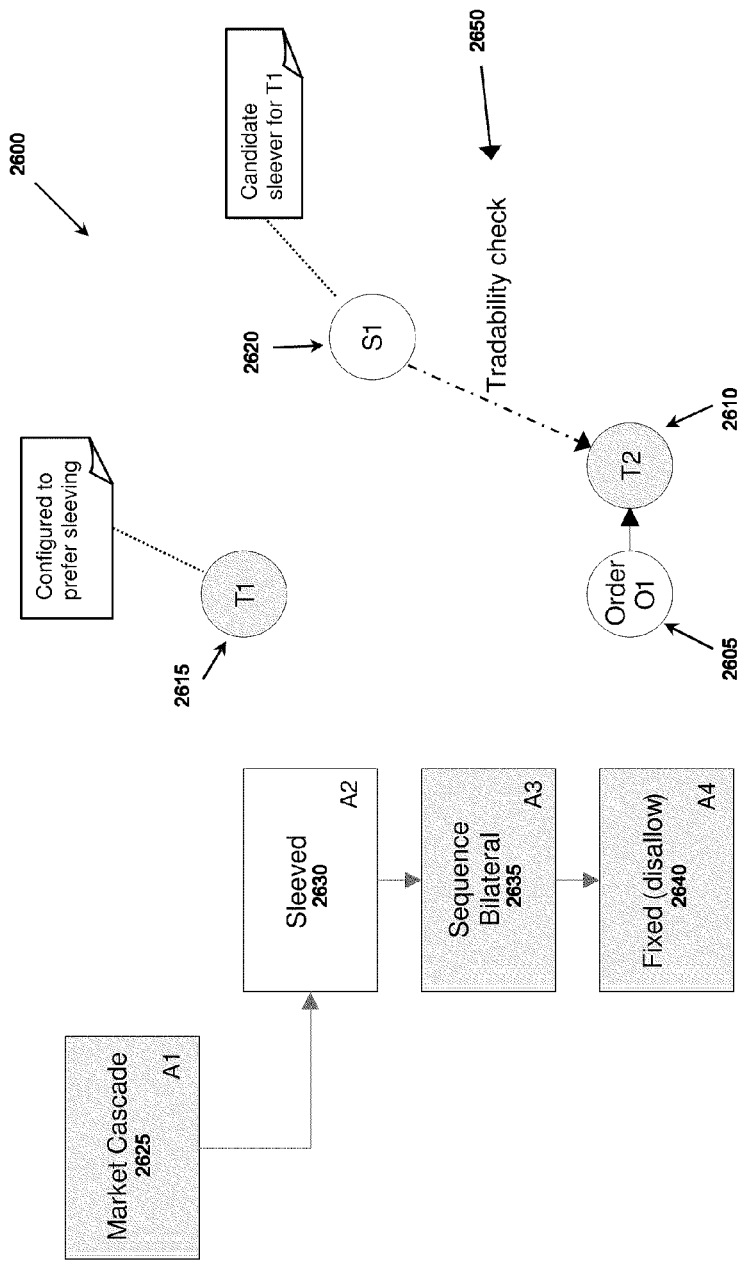
FIG. 26 illustrates the use of a sleeving agreement within the market structure of FIG. 23 and using the trading paths of FIG. 24.

FIG. 26 illustrates in greater detail how an exemplary order O1 (2605) placed in the market by trader T2 (2610) is analyzed according to the defined constraints. To determine whether the order is tradable by trader T1 (2615), the trade parameters are first provided to the root constraint A1 (2625). Examples of trade parameters include the trade initiator (T2), the trade aggressor (T1) and order information (e.g., volume and price) for O1. The cascade constraint A1 first consults sleever constraint A2 (2630), which in this implementation checks for a potential sleeve via S1 (2620). Accordingly, a tradability check 2650 is executed for the sleeving leg of the trade (the leg between sleeve trader S1 and initiator trader T2.

To determine whether this order is tradable by sleeve trader S1, the system passes the trade details back into the root constraint A1, including the trade initiator T2, trade aggressor S1 and order information of the original order O1, essentially repeating the process used to determine tradability for the original aggressor T1, with the aggressor party T1 replaced by sleeve trader S1. In this iteration constraint A1 calls constraint A2 to check for a tradability result, however in this iteration there are no other sleeve traders configured to sleeve on behalf of sleeve trader S1, so the sequence bilateral agreement 2635 is referenced to check for a tradability result. Constraint A3 indicates that sleeve trader S1 can trade directly with trader T2, thus returning an affirmative result.

Figure 27:
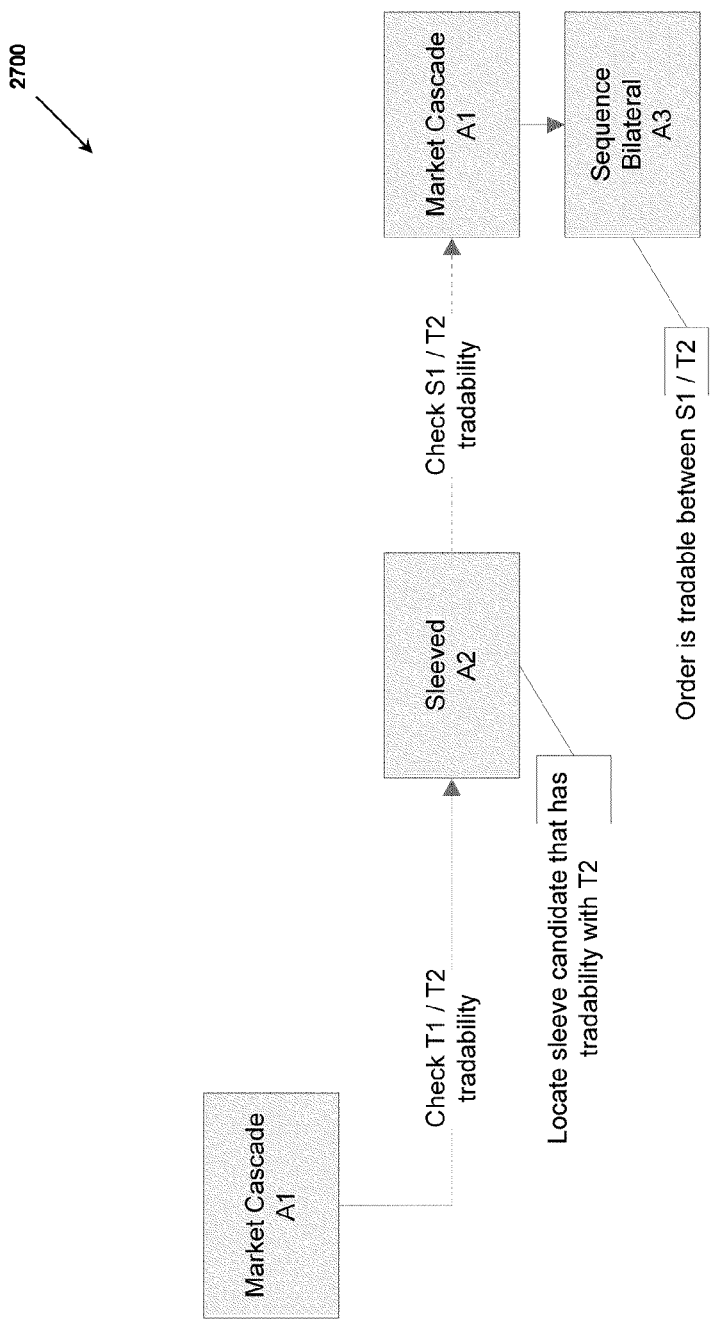
FIG. 27 illustrates the execution of a trade using a sleeving agreement within the market structure of FIG. 23 and using the trading paths of FIG. 24.

Control then passes back to the original sleeve constraint A2 to check for tradability between the two counterparties, which determines the final tradability result and returns an affirmative result for the order. The sequence of relevant trading constraints is illustrated in FIG. 27.

Figure 28:
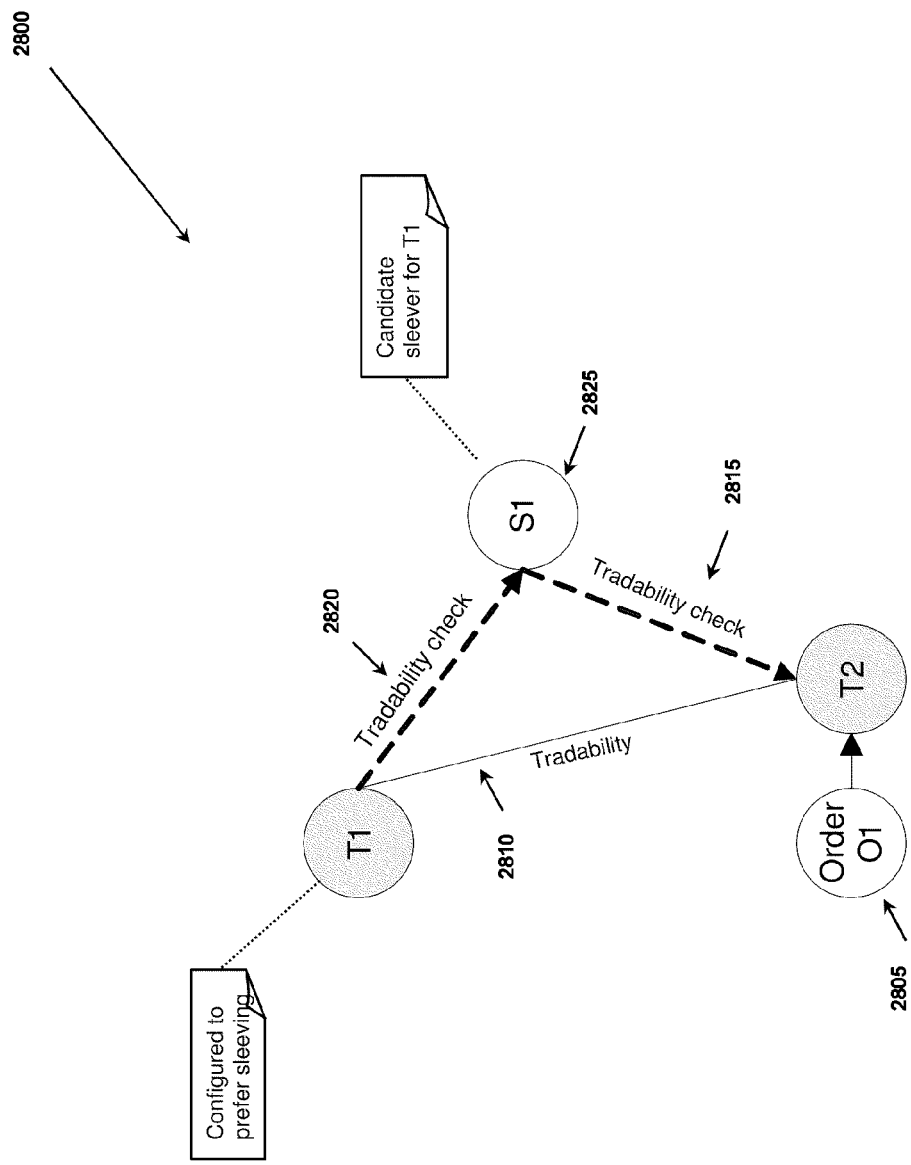
FIG. 28 illustrates the trade executability checks and results for the execution of a trade using a sleeving agreement within the market structure of FIG. 23 and using the trading paths of FIG. 24.

As the determination of tradability may incorporate the presumption of possible extra trade actions being created (e.g., additional parties or trading parameters), trades may also be actionable using the new parameters. For example, FIG. 28 illustrates the tradability of order O1 2805 as determined in the example above. An affirmative tradability result (solid line 2810) was achieved by analyzing the tradability checks (dashed lines 2815 and 2820) by utilizing the sleeve constraint S1 (2825) and verifying that sleeve trader candidate S1 can trade on behalf of trader T1 (2830) with trader T2 (2835).

If the trader T1 actually performs the trade, the system again passes the details of the trade—the initiator T2, trade aggressor T1 and order information (including volume and price) O1—to the main cascade constraint A1. To perform the trade, a similar process as described above with respect to tradability checks is performed, however any constraint that had previously affirmed tradability performs the necessary trade actions in the market, and the trade is executed. In the example illustrated in FIG. 26, when calling the sleeve constraint A2, the system first actions the trade of order O1 (2605) between initiator T2 (2610) and sleeve trader S1 (2620) as the trade aggressor, then creates and actions a new trade based on the order O1, using the sleeve trader S1 as the trade initiator and trader T1 (2615) as the aggressor.

Alternative implementations may use more complex mechanisms for determining candidate sleevers and for determining traders that may sleeve through particular sleevers. For example, a sleeve constraint may contain information for each trader indicating the candidate sleevers through which a trader may sleeve, or alternatively there may be a non-specific 'enable sleeved trades' option indicating any potential sleeving candidates are permitted. Similarly, a sleeve constraint may contain information for each candidate sleever indicating the specific circumstances under which they are to be considered eligible sleeving candidates, such as on a per trade aggressor and/or initiator basis, for example.

Furthermore, the system may or may not limit the complexity of calculations that are to be performed for each leg of a sleeve agreement tradability check. The above example assumed that there was tradability between the original aggressor and the sleever, but the system implementation may perform this check separately. Additionally, metrics such as the number of sleeved trades, computation time or computation resources used in a single tradability check may be used to limit the complexity of the calculations.

In some embodiments, a variety of techniques may be used to determine the order in which the system evaluates candidate sleevers, including randomizing the order so as not to favor any particular sleeve trader, or using internal or external criteria to calculate the order of evaluation. In some implementations, the number of candidate sleevers for a trader (or set of traders) may be limited (e.g., maximum of 3, fixed at 1, etc.).

In other implementations, trade parameters may be modified to derive, or imply prices based on prices in other markets in order to execute a trade. An "implied price" agreement permits the exploration of markets relating to the market on which a proposed trade would execute, in order to discover a combination of trades that would result in an equivalent trade. For example, if an agreement were configured to search for a potential 'July Apples' bid, it may be possible to trading both an bid on "July×August Apples" and an offer on "August Apples" (if they exist in the system) so that the net result is equivalent to having traded the required "July Apples" bid.

In order to support consistency between the processes of determining tradability and actually performing the trade, the implementation may include a mechanism for passing additional contextual information to the underlying platform, or tracking it internally. This contextual information can be retained in the system to be used when performing the trade. For example, a trade being executed via a sleeving agreement may carry with it the sleeving route (which parties are acting as sleevers and in which order) as it is passed to the trading system, which in turn executes the trade along the route. In addition, sleeving agreements involved in executing a trade may be passed the trade parameters that were affected by the sleeving agreement when the tradability for the deal was determined, including which sleeving party (or parties) was located by that agreement. Consequently, trades being executed may be associated with context information relating to multiple sleeving agreements.

Figure 29:
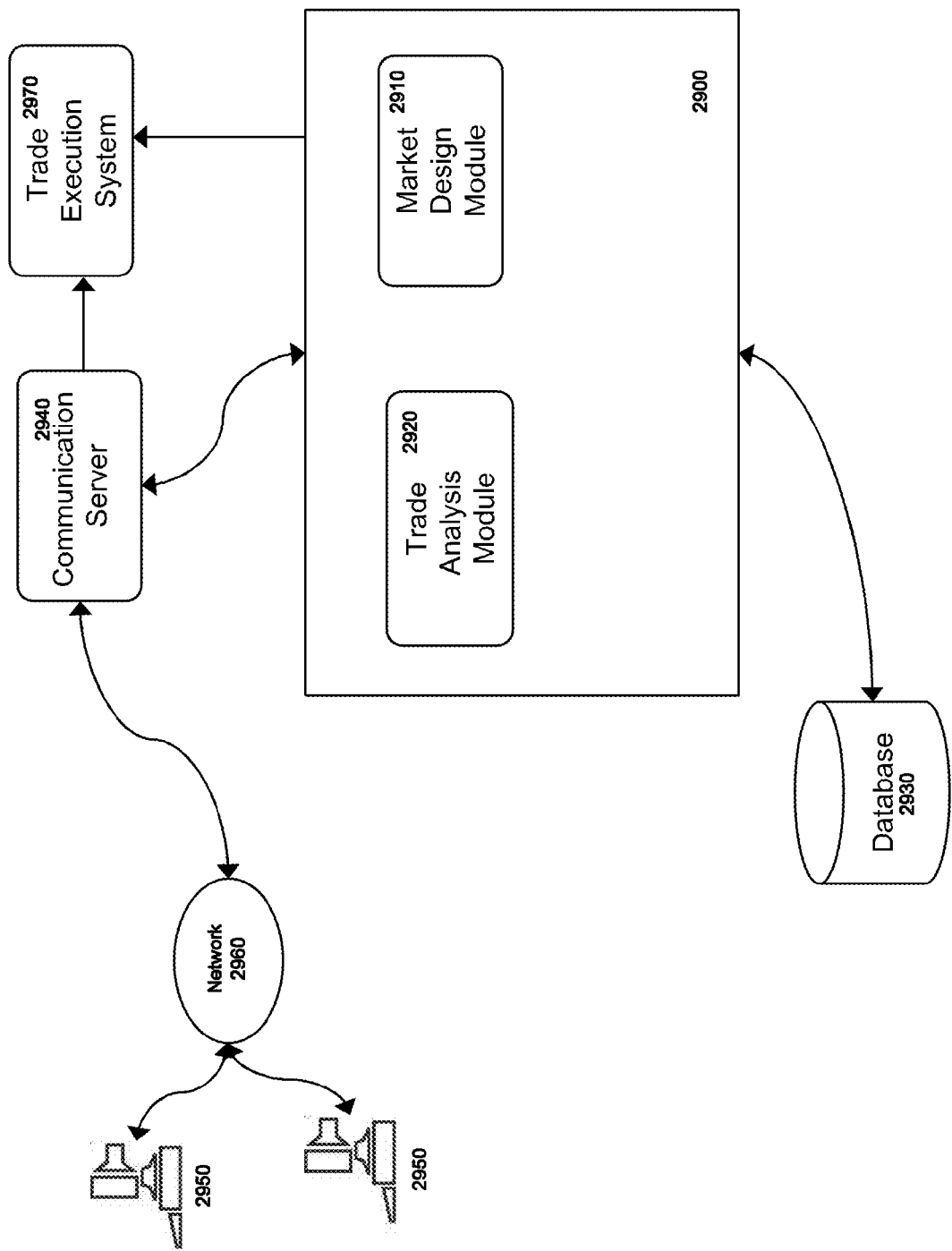
FIG. 29 is a schematic illustration of a system for implementing the analysis and execution of trades in accordance with one embodiment of the invention.

FIG. 29 provides a schematic of a system 2900 for implementing the techniques described above including a market design module 2910 and a trade execution analysis module 2920. The market design module provides the user-facing computerized application functions that facilitate the definition and configuration of the markets as described above. In some implementations, the market design module resides on a centrally-located server and presented to users via a client-server interface, whereas in other implementations the design and configuration functions may be provided as a client-resident application or applet. In some cases, some components of the configuration module 2910 may remain on the server (e.g., security, database connectivity, etc.) whereas other functions (interface presentation, data entry confirmation, etc.) may execute locally. In some embodiments, the configuration module 2910 provides a series of data entry screens and graphical design screens that allow users to pictorially represent the various markets using one or more trading constraints.

The trade execution analysis module 2920 receives trade parameters from trading counterparties and applies the trading rules against the parameters to determine if each agreement is satisfied. Further, in some embodiments the execution analysis module 2920 retains the results of each determination for a trade or series of trades and, once all agreements are analyzed, confirms whether or not the trade may be executed. In some cases, the execution analysis module 2920 reviews user-provided information such as instructions to alter one or more trade parameters in order to satisfy an agreement and thus allow the trade. The execution analysis module 2920 may also review tradability sleeving agreements and, if authorized, execute trades using third-party intermediaries to facilitate trades that would perhaps otherwise not be executable.

In some embodiments, the system may, include one or more databases 2930, which store data related to the market participants, market constraints and trades. For instance, the database 2930 may store information relating to users of the system, relationships among the users, market statistics, financial instrument definitions, credit rules among market participants, server availability, and network traffic information. The database 2930 may also contain data regarding individual transactions, whether they be completed, pending, or open. The database 2930 provides data to the transaction server and distribution server. Examples of databases that may be used to implement this functionality include the MySQL Database Server Sun Microsystems of Santa Clara, Calif., the PostgreSQL Database Server by the PostgreSQL Global Development Group of Berkeley, Calif., and the ORACLE Database Server offered by ORACLE Corp. of Redwood Shores, Calif.

In implementations in which the design module 2910 operates as a web-based application, the communication between the system 2900 and users may be managed by a communications server 2940. The communications server 2940 provides the interface for communication with clients 2950 involving HTTP/S requests and responses, Java messages, SMTP messages, POP3 messages, instant messages, RSS feeds, as well as other electronic messages. In some instances, messages may be transferred from the clients 2950 to the server 2940, from the server 2940 to the client 2950, or both. The communication server 2940 may be implemented as software running on one or more servers, or may be implemented as a stand-alone server. In other embodiments, the communication server 2940 can also communicate using other protocols or mechanisms. Examples of communication servers that may be used to implement this functionality include the Apache Web Server from the Apache Foundation, the Microsoft Internet Information Server, and the Websphere web server from IBM.

The clients 2950 are preferably implemented as software running on a personal or professional grade computer workstation (e.g., a PC with an INTEL processor or an APPLE MACINTOSH) capable of running such operating systems as the MICROSOFT WINDOWS family of operating systems from Microsoft Corporation of Redmond, Wash., the MACINTOSH OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The clients 2950 may also be implemented on such hardware as a smart or dumb terminal, network computer, wireless device, personal data assistant, information appliance, workstation, minicomputer, mainframe computer, or other computing device, that is operated as a general purpose computer or a special purpose hardware device solely used for serving as a client interacting with the system 2900.

A communications network 2960 connects the clients 2950 with the server 2940. The communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client and the connection between the client and the server can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

In some embodiments, the system transmits trade execution orders to a trade execution system 2970, at which those trades that satisfied all (or the minimum set of) agreements are executed. The transmission may occur via the communications server 2940 (in cases in which trade information is exposed via a web service or other such protocol) or directly from the system 2900 via any number of standard data transmission techniques.

The system 2900 may be implemented on one or more servers that provide the application processing component for implementing the techniques for determining the executability of trades as described above. In one embodiment, the server includes a transaction server for evaluating trade parameters against the constraints and a distribution server for providing the information regarding the proposed trades to the trading client interface software. The server is preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software than that described here could also be used, depending on the capacity of the device and the number of users and the amount of data received. For example, the server may be part of a server farm or server network, which is a logical group of one or more servers. As another example, there could be multiple servers that may be associated or connected with each other, or multiple servers could operate independently, but with shared data. As is typical in large-scale systems, application software could be implemented in components, with different components running on different server computers, on the same server, or some combination.

The modules described throughout the specification can be implemented in whole or in part as a software program (or programs) operating on one or more processors using any suitable programming language or languages (C++, C#, java, Visual Basic, LISP, BASIC, PERL, etc.) and/or as a hardware device (e.g., ASIC, FPGA, processor, memory, storage and the like).

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method of executing a proposed trade within an electronic market, the proposed trade comprising a plurality of trade parameters, the computer comprising a processor programmed to perform the steps of:
    providing a schema of dependent rules as a directed graph comprising nodes representing constraints associated with the market, wherein the nodes comprise:
        a market node representing constraints applicable to the market and sub-markets within the market;
        at least one sub-market node representing constraints applicable to a sub-market of the market and traversed after the market node; and
        a main node representing globally applicable constraints and traversed before the market node;
    applying the trade parameters against the constraints by traversing the nodes of the directed graph based on the trade parameters;
    determining that the constraints are satisfied;
    confirming the executability of the trade; and
    transmitting the trade parameters to a trade execution system for execution thereon.

2. The method of claim 1 wherein the trade parameters comprise a time, at least two trading parties, and tradable subject matter, the constraints including (i) time-based constraints defining one or more periods within which a trade can be executed or cannot be executed; (ii) party-based constraints limiting parties who can trade with each other; (iii) subject-matter constraints defining tradable subject matter.

3. The method of claim 2 wherein at least some of the time-based constraints and at least some of the party-based constraints depend on the subject-matter constraints.

4. The method of claim 2 wherein at least some of the party-based constraints and at least some of the subject-matter constraints depend on the time-based constraints.

5. The method of claim 2 wherein at least some of the time-based constraints and at least some of the subject-matter constraints depend on the party-based constraints.

6. The method of claim 2 wherein at least one of the party-based constraints comprises a constraint that prohibits trades in which the two trading parties are the same party.

7. The method of claim 2 wherein at least one of the party-based constraints describes a credit agreement between the at least two trading parties.

8. The method of claim 2 wherein at least one of the subject-matter constraints describes one or more clearing agreements governing the execution of trades for the respective subject matter.

9. The method of claim 2 wherein the tradable subject matter comprises one or more financial instruments.

10. The method of claim 1 wherein traversing the nodes comprises determining, for a proposed trade, the results of the applying step at a lowest level node of the graph for each relevant constraint.

11. The method of claim 1 further comprising traversing multiple branches of the directed graph and wherein the trade is considered executable if and only if the application step permits the trade for each of the multiple branches of the graph.

12. The method of claim 1 further comprising traversing multiple branches of the directed graph and wherein the trade is considered executable if at least one application of the rules to the constraints permits the trade.

13. The method of claim 1 further comprising traversing multiple branches of the directed graph, each branch representing a portion of the trade, and wherein only a subset of the trade is determined to be executable, the subset corresponding to the branch the trade is considered executable if at least one application of the rules to the constraints permits the trade.

14. The method of claim 1 further comprising:
    determining additional trading metadata associated with the trade;
    providing the trading metadata to a trade execution system, at which the trade is executed according to the trading metadata.

15. A system for determining the executability of a proposed trade within a market, the proposed trade comprising a plurality of trade parameters, the system comprising:
    a processor;
    a memory operatively coupled to the processor; and
    a software program stored on the memory and executable by the processor, the software program comprising:
        a market configuration module for facilitating the entry and manipulation of a directed graph comprising nodes representing constraints associated with the market, wherein the nodes comprise:
            a market node representing constraints applicable to the market and sub-markets within the market;
            at least one sub-market node representing constraints applicable to a sub-market of the market and traversed after the market node; and
            a main node representing globally applicable constraints and traversed before the market node; and
        a trade analysis module for applying the trade parameters against the constraints by traversing the nodes of the directed graph based on the trade parameters and confirming the executability of the trade if the constraints are satisfied.

16. The system of claim 15 wherein the trade analysis module further determines additional trading metadata associated with the trade and provides the trading metadata to a trade execution system, at which the trade is executed according to the trading metadata.

17. The system of claim 16 further comprising a database module for storing one or more of the plurality of trading parameters, the hierarchical rules schema and the trading metadata.

18. An article of manufacture having computer-readable program portions embedded thereon for determining the executability of a proposed trade within a market, the program portions comprising instructions for:
    providing a schema of dependent rules as a directed graph comprising nodes representing constraints associated with the market, wherein the nodes comprise:
        a market node representing constraints applicable to the market and sub-markets within the market;

at least one sub-market node representing constraints applicable to a sub-market of the market and traversed after the market node; and a main node representing globally applicable constraints and traversed before the market node;

receiving a plurality of trade parameters associated with the trade;

applying the trade parameters against the trading constraints by traversing the nodes of the directed graph based on the trade parameters;

determining that the constraints are satisfied; and confirming the executability of the trade.

19. The article of manufacture of claim 18 wherein the program portions further comprise instructions for transmitting the trade parameters to a trade execution system for execution of the trade thereon.

20. The method of claim 1 wherein the nodes further comprise a third-party clearing party acting as an intermediary between two parties who, absent the third-party clearing party, would not be permitted to trade with each other.

21. The system of claim 15 wherein the nodes further comprise a third-party clearing party acting as an intermediary between two parties who, absent the third-party clearing party, would not be permitted to trade with each other.

22. The article of manufacture of claim 18 wherein the nodes further comprise a third-party clearing party acting as an intermediary between two parties who, absent the third-party clearing party, would not be permitted to trade with each other.

* * * * *